United States Patent
Soleimani et al.

(10) Patent No.: US 11,501,084 B1
(45) Date of Patent: Nov. 15, 2022

(54) GRAPHICAL USER INTERFACE FOR VISUALIZING CONTRIBUTING FACTORS TO A MACHINE-LEARNING MODEL'S OUTPUT

(71) Applicant: SAS Institute Inc., Cary, NC (US)

(72) Inventors: Reza Soleimani, Raleigh, NC (US); Samuel Paul Leeman-Munk, Durham, NC (US); James Allen Cox, Corpus Christi, TX (US); David Blake Styles, Raleigh, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 17/747,139

(22) Filed: May 18, 2022

Related U.S. Application Data

(60) Provisional application No. 63/287,411, filed on Dec. 8, 2021.

(51) Int. Cl.
*G06F 40/30* (2020.01)
*G06F 40/284* (2020.01)
*G06F 40/205* (2020.01)
*G06N 20/20* (2019.01)

(52) U.S. Cl.
CPC ............ *G06F 40/30* (2020.01); *G06F 40/205* (2020.01); *G06F 40/284* (2020.01); *G06N 20/20* (2019.01)

(58) Field of Classification Search
None
See application file for complete search history.

(56) References Cited

U.S. PATENT DOCUMENTS

| | | |
|---|---|---|
| 5,222,210 A | 6/1993 | Leivian |
| 5,444,796 A | 8/1995 | Ornstein |
| 7,251,637 B1 | 7/2007 | Caid et al. |
| 7,756,845 B2 | 7/2010 | Madani et al. |

(Continued)

OTHER PUBLICATIONS

Cho et al., "Learning Phrase Representations using RNN Encoder-Decoder for Statistical Machine Translation" Universite de Montreal (2014) 15 pages.

(Continued)

*Primary Examiner* — Richa Mishra
(74) *Attorney, Agent, or Firm* — Kilpatrick Townsend & Stockton LLP

(57) ABSTRACT

In one example, a system can execute a first machine-learning model to determine an overall classification for a textual dataset. The system can also determine classification scores indicating the level of influence that each token in the textual dataset had on the overall classification. The system can select a first subset of the tokens based on their classification scores. The system can also execute a second machine-learning model to determine probabilities that the textual dataset falls into various categories. The system can determine category scores indicating the level of influence that each token had on a most-likely category determination. The system can select a second subset of the tokens based on their category scores. The system can then generate a first visualization depicting the first subset of tokens color-coded to indicate their classification scores and a second visualization depicting the second subset of tokens color-coded to indicate their category scores.

30 Claims, 23 Drawing Sheets
(6 of 23 Drawing Sheet(s) Filed in Color)

(56) References Cited

U.S. PATENT DOCUMENTS

| | | | |
|---|---|---|---|
| 8,843,427 B1 | 9/2014 | Lin et al. | |
| 9,836,455 B2 | 12/2017 | Martens et al. | |
| 11,354,599 B1* | 6/2022 | Hübl | G06N 20/00 |
| 11,361,151 B1* | 6/2022 | Guberman | G06F 16/35 |
| 2005/0228783 A1 | 10/2005 | Shanahan et al. | |
| 2018/0018553 A1 | 1/2018 | Bach et al. | |
| 2019/0156153 A1* | 5/2019 | Can | G06V 10/40 |
| 2020/0387545 A1* | 12/2020 | Tripathi | G06V 30/416 |
| 2021/0183484 A1* | 6/2021 | Shaib | G06F 40/295 |
| 2021/0357634 A1* | 11/2021 | Salahi | G06K 9/627 |

OTHER PUBLICATIONS

Xisen Jin et al., "Towards Hierarchical Importance Attribution: Explaining Compositional Semantics for Neural Sequence Models", Published as a conference paper at ICLR 2020, 15 pages.

Karpathy et al., "Visualizing and Understanding Recurrent Networks" Computer Science Department, Stanford University, (2015) 12 pages.

Li et al., "Understanding Neural Networks through Representation Erasure" Computer Science Department, Stanford University, (2017) 18 pages.

Li et al., "Visualizing and Understanding Neural Models in NLP" Computer Science Department, Stanford University, (2016) 10 pages.

Ming et al., "Understanding Hidden Memories of Recurrent Neural Networks" Hong Kong University of Science and Technology (2017) 12 pages.

Murdoch et al., "Automatic Rule Extraction from Long Short Term Memory Networks" Published as a conference paper at ICLR (2017) 12 pages.

Sheikh et al., "Learning Word Importance with the Neural Bag-of-Words Model" Proceedings of the 1st Workshop on Representation Learning for NLP, (2016) pp. 222-229.

StatSoft "Neural Networks" 2002 [Online] Downloaded Apr. 14, 2014, http://www.obgyn.cam.ac.uk/cam-only/statsbook/stneunet.bim (Year: 2002).

* cited by examiner

GRAPHICAL USER INTERFACE FOR VISUALIZING CONTRIBUTING FACTORS TO A MACHINE-LEARNING MODEL'S OUTPUT

REFERENCE TO RELATED APPLICATIONS

This claims the benefit of priority under 35 U.S.C. § 119(e) to U.S. Provisional Patent Application No. 63/287,411, filed Dec. 8, 2021, the entirety of which is hereby incorporated by reference herein.

TECHNICAL FIELD

The present disclosure relates generally to graphical user interfaces output on computers. More specifically, but not by way of limitation, this disclosure relates to a graphical user interface configured for visualizing contributing factors that influenced a particular output from a machine-learning model, such as a particular sentiment classification determined by the machine-learning model in relation to an input textual dataset.

BACKGROUND

Many industries rely on machine-learning models, such as neural networks and support vector machines, in making decisions. Such machine-learning models may be executed on a computer to generate outputs, which may serve as the basis for making said decisions. For example, a system administrator may execute a machine-learning model configured to predict how much memory or storage space will be required to meet demand at a future point in time. Based on the predicted memory or storage consumption output by the machine-learning model, the system administrator can decide whether to preemptively add additional memory or storage units to the computer infrastructure to meet that future demand. Because these types of decisions can have a significant impact on operations and customers, and they are influenced by the outputs of the machine-learning models, it may be useful to understand why a machine-learning model generated a particular output.

SUMMARY

One example of the present disclosure includes a system comprising one or more processors and one or more memories. The one or more memories can include program code that is executable by the one or more processors for causing the one or more processors to: provide a textual dataset as input to a first machine-learning model, the first machine-learning model being configured to analyze the textual dataset and generate a first output indicating an overall classification for the textual dataset; determine a plurality of classification scores for a plurality of tokens in the textual dataset, each token in the plurality of tokens being assigned a respective classification score indicating a respective level of influence that the token had on the overall classification from the first machine-learning model; select a first subset of tokens from among the plurality of tokens based on the plurality of classification scores, each token in the first subset of tokens being selected based on the respective classification score corresponding to the token being greater than a first predefined threshold; provide the textual dataset as input to a second machine-learning model, the second machine-learning model being configured to analyze the textual dataset and generate a second output including a plurality of probabilities, each probability of the plurality of probabilities indicating a respective likelihood that the textual dataset relates to a respective category of a plurality of categories, wherein the plurality of probabilities includes a highest probability value indicating a most likely category associated with the textual dataset; determine a plurality of category scores for the plurality of tokens, each token in the plurality of tokens being assigned a respective category score indicating a respective level of influence that the token had on the most likely category determined by the second machine-learning model; select a second subset of tokens from among the plurality of tokens based on the plurality of category scores, each token in the second subset of tokens being selected based on the respective category score corresponding to the token being greater than a second predefined threshold; and generate a graphical user interface including: a first graphical visualization that depicts the first subset of tokens using a first color-coding scheme that indicates the respective classification score of each token in the first subset of tokens; and a second graphical visualization that depicts the second subset of tokens using a second color-coding scheme that indicates the respective category score of each token in the second subset of tokens.

Another example of the present disclosure includes a non-transitory computer-readable medium comprising program code that is executable by one or more processors for causing the one or more processors to: provide a textual dataset as input to a first machine-learning model, the first machine-learning model being configured to analyze the textual dataset and generate a first output indicating an overall classification for the textual dataset; determine a plurality of classification scores for a plurality of tokens in the textual dataset, each token in the plurality of tokens being assigned a respective classification score indicating a respective level of influence that the token had on the overall classification from the first machine-learning model; select a first subset of tokens from among the plurality of tokens based on the plurality of classification scores, each token in the first subset of tokens being selected based on the respective classification score corresponding to the token being greater than a first predefined threshold; provide the textual dataset as input to a second machine-learning model, the second machine-learning model being configured to analyze the textual dataset and generate a second output including a plurality of probabilities, each probability of the plurality of probabilities indicating a respective likelihood that the textual dataset relates to a respective category of a plurality of categories, wherein the plurality of probabilities includes a highest probability value indicating a most likely category associated with the textual dataset; determine a plurality of category scores for the plurality of tokens, each token in the plurality of tokens being assigned a respective category score indicating a respective level of influence that the token had on the most likely category determined by the second machine-learning model; select a second subset of tokens from among the plurality of tokens based on the plurality of category scores, each token in the second subset of tokens being selected based on the respective category score corresponding to the token being greater than a second predefined threshold; and generate a graphical user interface including: a first graphical visualization that depicts the first subset of tokens using a first color-coding scheme that indicates the respective classification score of each token in the first subset of tokens; and a second graphical visualization that depicts the second subset of tokens using a second color-coding scheme that indicates the respective category score of each token in the second subset of tokens.

Yet another example of the present disclosure includes a method involving providing a textual dataset as input to a first machine-learning model, the first machine-learning model being configured to analyze the textual dataset and generate a first output indicating an overall classification for the textual dataset; determining a plurality of classification scores for a plurality of tokens in the textual dataset, each token in the plurality of tokens being assigned a respective classification score indicating a respective level of influence that the token had on the overall classification from the first machine-learning model; selecting a first subset of tokens from among the plurality of tokens based on the plurality of classification scores, each token in the first subset of tokens being selected based on the respective classification score corresponding to the token being greater than a first predefined threshold; providing the textual dataset as input to a second machine-learning model, the second machine-learning model being configured to analyze the textual dataset and generate a second output including a plurality of probabilities, each probability of the plurality of probabilities indicating a respective likelihood that the textual dataset relates to a respective category of a plurality of categories, wherein the plurality of probabilities includes a highest probability value indicating a most likely category associated with the textual dataset; determining a plurality of category scores for the plurality of tokens, each token in the plurality of tokens being assigned a respective category score indicating a respective level of influence that the token had on the most likely category determined by the second machine-learning model; selecting a second subset of tokens from among the plurality of tokens based on the plurality of category scores, each token in the second subset of tokens being selected based on the respective category score corresponding to the token being greater than a second predefined threshold; and generating a graphical user interface including: a first graphical visualization that depicts the first subset of tokens using a first color-coding scheme that indicates the respective classification score of each token in the first subset of tokens; and a second graphical visualization that depicts the second subset of tokens using a second color-coding scheme that indicates the respective category score of each token in the second subset of tokens. The method operations can be performed by one or more processors.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The patent or application file contains at least one drawing executed in color. Copies of this patent or patent application publication with color drawings will be provided by the office upon request and payment of any necessary fee. The present disclosure is described in conjunction with the appended figures.

Figure 1:
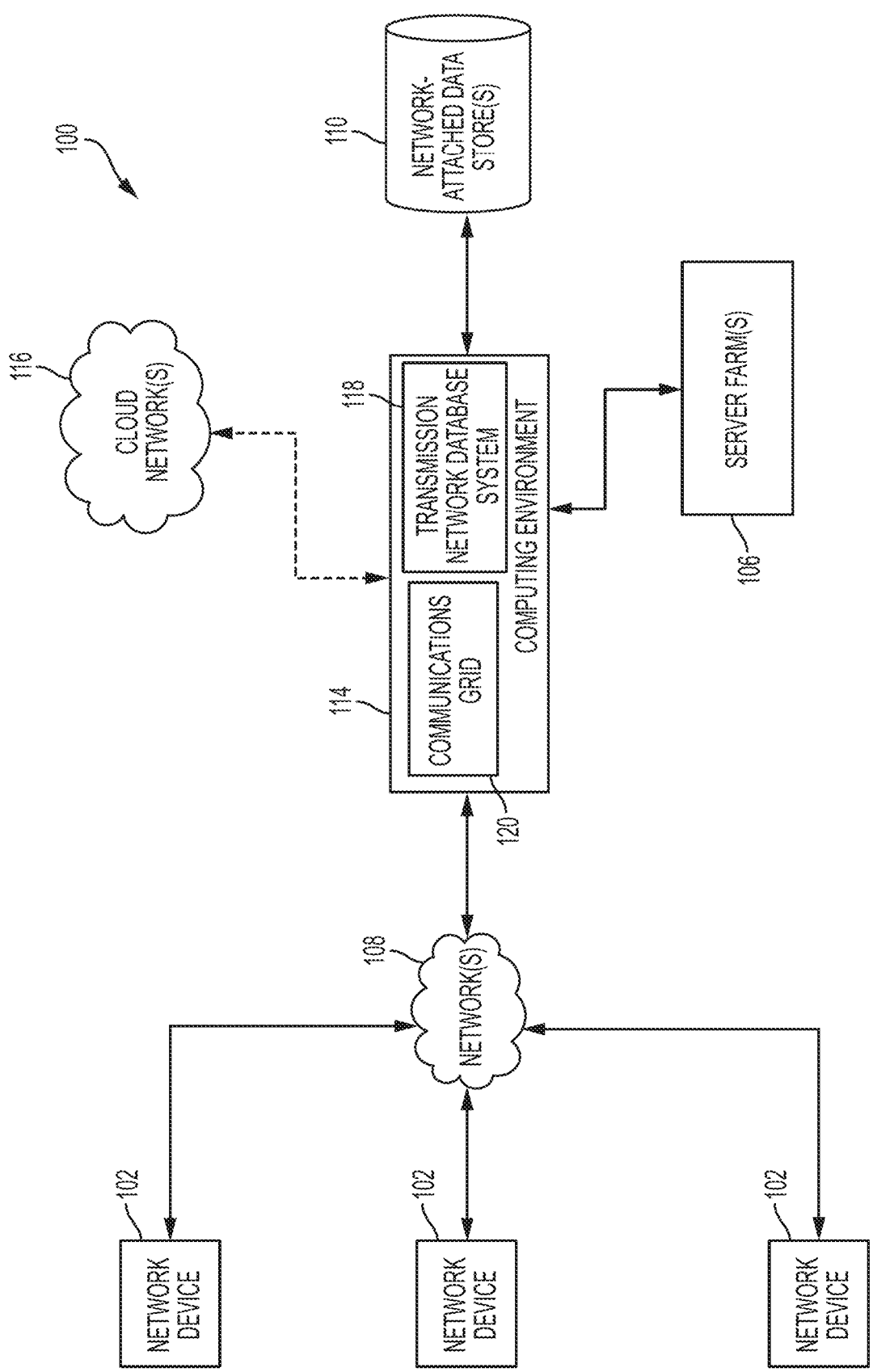
FIG. 1 shows a block diagram of an example of the hardware components of a computing system according to some aspects of the present disclosure.

In the appended figures, similar components or features can have the same reference number. Further, various components of the same type may be distinguished by following the reference number with a lowercase letter that distinguishes among the similar components. If only the first reference number is used in the specification, the description is applicable to any one of the similar components having the same first reference number irrespective of the lowercase letter.

DETAILED DESCRIPTION

Many industries rely on machine-learning models in making decisions. Because such models are relied upon in decision making, it can be important for the individuals relying on the machine-learning models to have a good understanding of how and why the models produce certain outputs. It may even be required by law or regulation in some industries (e.g., the banking industry) that individuals relying on machine-learning models be able to explain the model's operation and decision logic. But machine-learning models are not currently well understood and they are often considered a "black box" from a functional standpoint. Although the general procedure by which the machine-learning models are trained may be known to the individuals using them, a deeper understanding of the inner workings of the models is often lacking. This is because the models are computer programs that execute a huge number of complex operations rapidly, so their inner workings are often obfuscated to those using and developing them. And as machine-learning models continue to grow in size and complexity, with some models now having over 100 billion parameters, it is becoming increasingly difficult to understand what a machine-learning model is doing to produce its final outputs.

Some examples of the present disclosure can overcome one or more of the abovementioned problems by providing a graphical user interface that includes graphical visualizations designed to indicate contributing factors that influenced a particular output from a machine-learning model. For example, the graphical user interface can include a graphical visualization indicating which words in a textual dataset were most heavily relied upon by a machine-learning model in producing a particular sentiment classification. By identifying which factors contributed most heavily to a particular output from a machine-learning model, it may help the users better understand why the model produced a certain result. This may help such users ensure that they are complying with applicable laws and regulations, as well as help them understand how certain inputs influence the model's outputs.

The graphical visualizations may also be used in a variety of ways by model developers. For example, the graphical visualizations can help developers understand how to create machine-learning models that are more efficient, robust, and accurate. For instance, if the graphical visualization indicates that a particular type of word has little impact on the machine-learning model's result, a developer may adjust the architecture of the model to ignore such words. This may allow the model to execute faster and consume fewer computing resources (e.g., processing power, memory, and storage space), while still maintaining a high degree of accuracy. In some cases, the graphical visualizations may also help developers troubleshoot machine-learning models that are functioning improperly. For example, if a machine-learning model is producing an unexpected result, a developer may be able to use the visualizations described herein to understand which factors most heavily contributed to that unexpected result. This may help the developer identify the root cause of the problem. For instance, if the machine-learning model is weighting certain types of textual terms more heavily than it should be, it may signify a problem in the model's architecture relating to how those textual terms are treated. So, the model developer can then use this information to correct the model's architecture.

One example of a graphical visualization described herein can include a hierarchically arranged list of tokens extracted from an input textual dataset, where the tokens are color coded to indicate how much they contributed to an overall classification of the textual dataset determined by a machine-learning model. A token can include a word, a portion of a word, or a punctuation element in the input textual dataset. More specifically, a user can supply a textual dataset of to the system. The textual dataset can include a relatively large set of tokens, such as thousands of tokens. The system can apply a machine-learning model to the textual dataset to determine an overall classification for the textual dataset. The machine-learning model may have been previously trained for this classification purpose. The overall classification may be a sentiment classification (e.g., positive, negative, or neutral) or another type of classification. By using techniques described in greater detail later on, the system can then determine a subset of the tokens from the input textual dataset that contributed most heavily to the overall classification determined by machine-learning model. Using this information, the system can generate a graphical visualization that organizes that subset of tokens in a hierarchical format and color codes them to indicate their relative weights in the machine-learning model's decision-making process. This may allow a user or developer to understand why the machine-learning model selected that particular overall classification. This type of visualization may be particularly useful for situations involving a relatively small number of possible classifications, such as three or fewer classifications.

Another example of a graphical visualization described herein can include a hierarchically arranged list of tokens extracted from an input textual dataset, where the tokens are color coded to indicate whether they correspond to an overall category for the textual dataset determined by a machine-learning model, or whether they correspond to a remaining set of categories not selected by the machine-learning model. For example, the system can apply a machine-learning model to an input textual dataset to determine a particular category corresponding to the textual dataset. The particular category can be selected by the machine-learning model from among a set of N predefined categories. For example, the particular category can be a particular topic selected from among a group of 20 candidate topics. The machine-learning model may have been previously trained for this categorization purpose. By using techniques described in greater detail later on, the system can then determine a subset of the tokens from the input textual dataset that contributed most heavily to the overall category selected by machine-learning model. Using this information, the system can generate a graphical visualization that organizes that subset of tokens in a hierarchical format and color codes them to indicate their relative weights in the machine-learning model's decision-making process. This may allow a user or developer to understand why the machine-learning model selected that particular category. This type of visualization may be particularly useful for situations involving a relatively large number of possible categories, such as five or more categories.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-12 depict examples of systems and methods usable for generating a graphical user interface for visualizing contributing factors to a machine-learning model output according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that may be collectively be referred to herein as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for use in generating a graphical user interface for visualizing contributing factors to a machine-learning model output, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for generating a graphical user interface (e.g., for visualizing contributing factors to a machine-learning model output) to a network-attached data store 110 for storage. The computing environment 114 may later retrieve the data from the network-attached data store 110 and use the data to generate a graphical user interface for visualizing contributing factors to a machine-learning model output.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for generating a graphical user interface for visualizing contributing factors to a machine-learning model output.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for generating a graphical user interface for visualizing contributing factors to a machine-learning model output. For example, the computing environment 114, a network device 102, or both can implement one or more versions of the processes discussed with respect to any of the figures.

Figure 2:
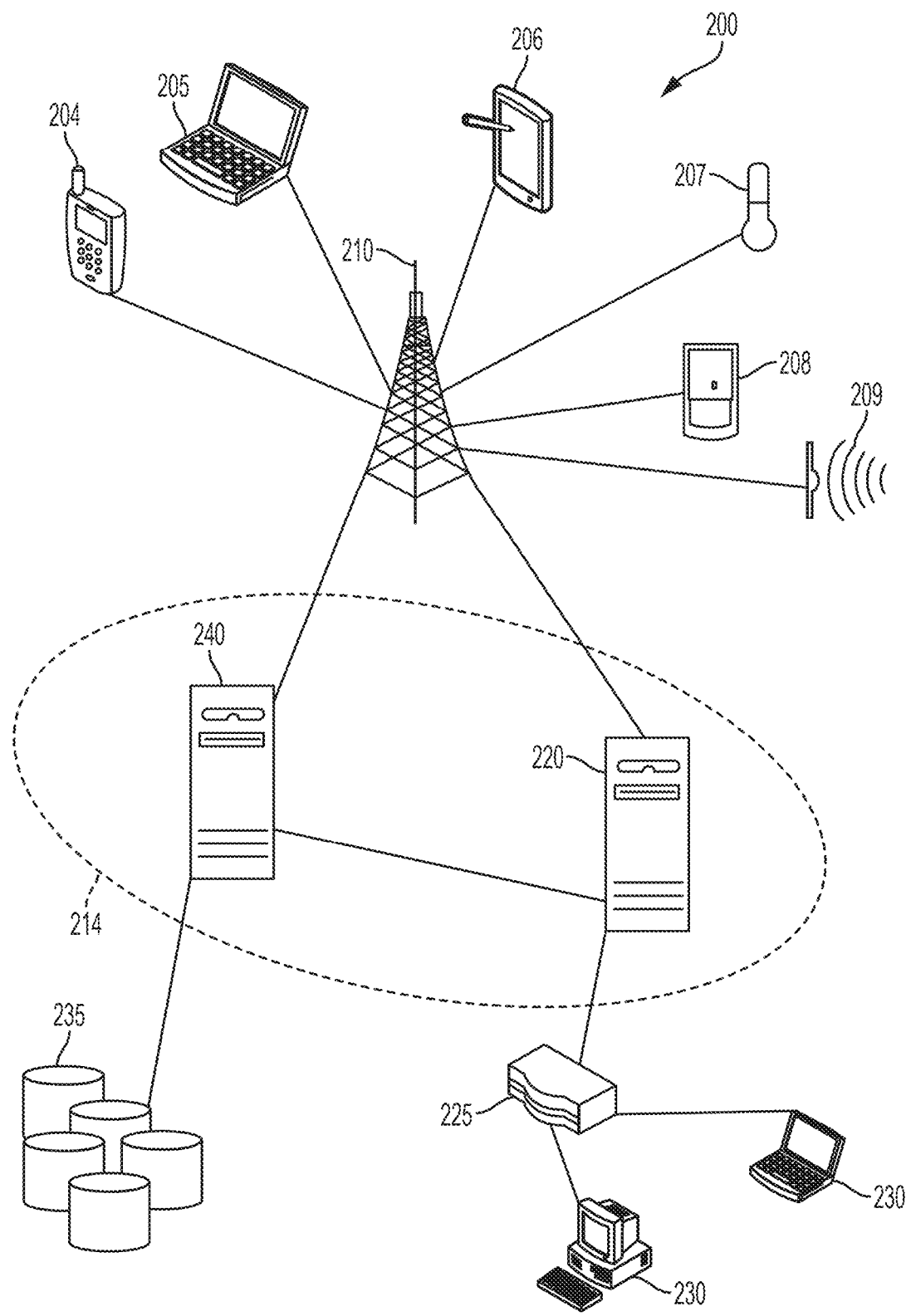
FIG. 2 shows an example of devices that can communicate with each other over an exchange system and via a network according to some aspects of the present disclosure.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., further analyzing the data).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project for generating a graphical user interface for visualizing contributing factors to a machine-learning model output, the computing environment 214 can perform a pre-analysis of input data. The pre-analysis can include determining whether the data is in a correct format for use by the machine-learning model and, if not, reformatting the data into the correct format.

Figure 3:
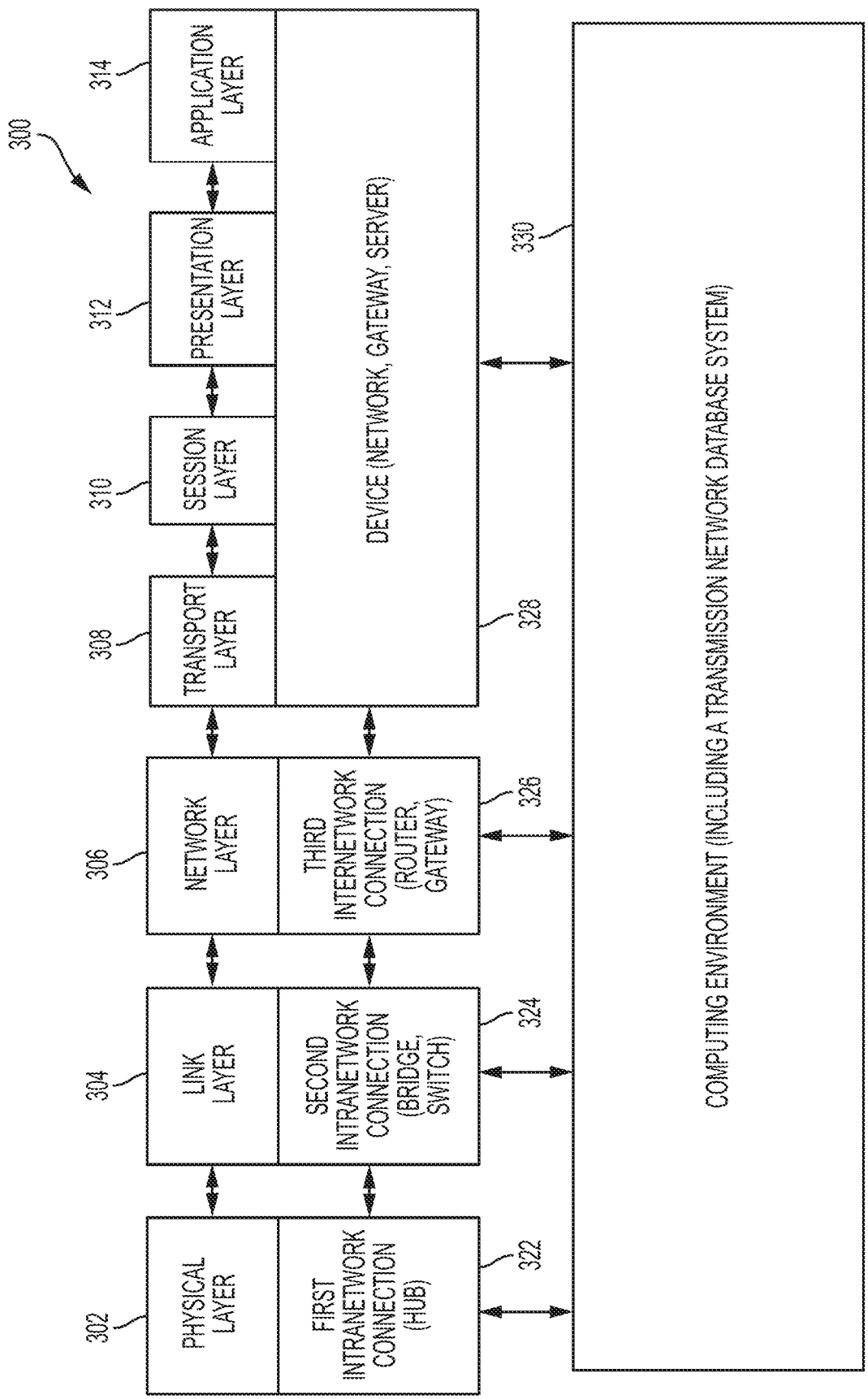
FIG. 3 shows a block diagram of a model of an example of a communications protocol system according to some aspects of the present disclosure.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for generating a graphical user interface for visualizing contributing factors to a machine-learning model output, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for generating a graphical user interface for visualizing contributing factors to a machine-learning model output.

Figure 4:
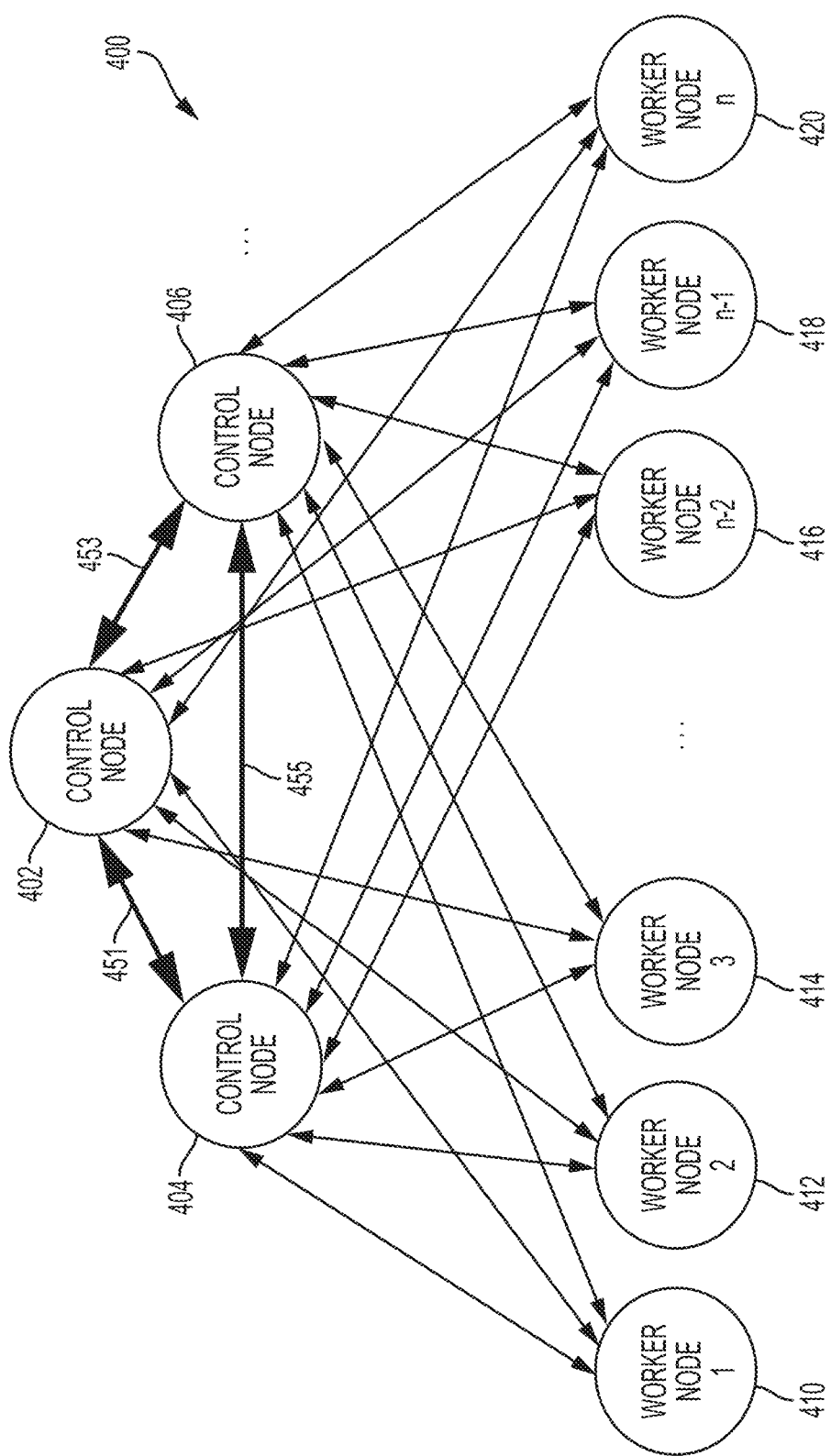
FIG. 4 shows a hierarchical diagram of an example of a communications grid computing system including a variety of control and worker nodes according to some aspects of the present disclosure.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to generating a graphical user interface for visualizing contributing factors to a machine-learning model output. The project may include the data set. The data set may be of any size and can include a textual dataset. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for generating a graphical user interface (e.g., for visualizing contributing factors to a machine-learning model output) can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may use at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from a control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to generate a graphical user interface for visualizing contributing factors to a machine-learning model output.

Figure 5:
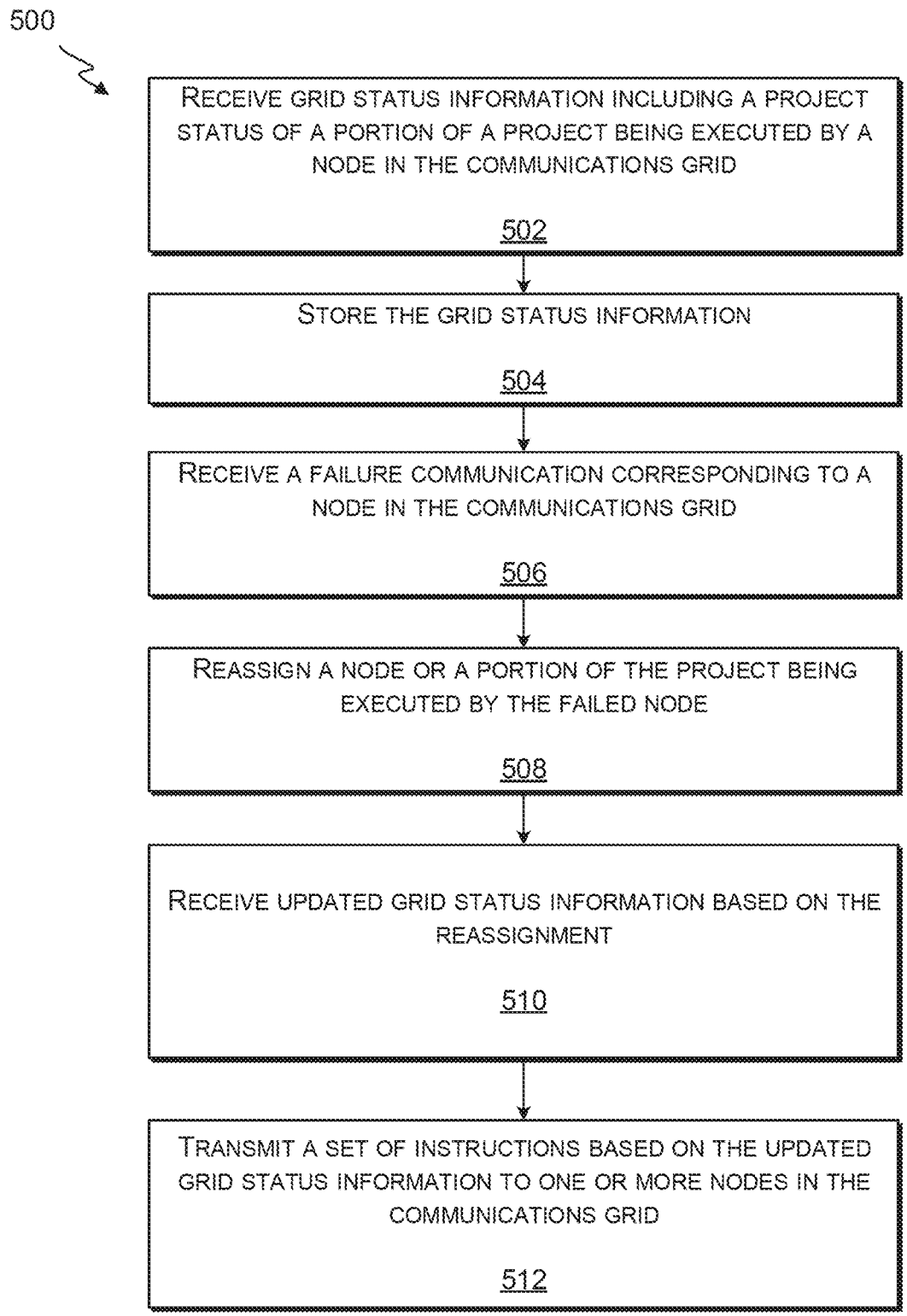
FIG. 5 shows a flow chart of an example of a process for adjusting a communications grid or a work project in a communications grid after a failure of a node according to some aspects of the present disclosure.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
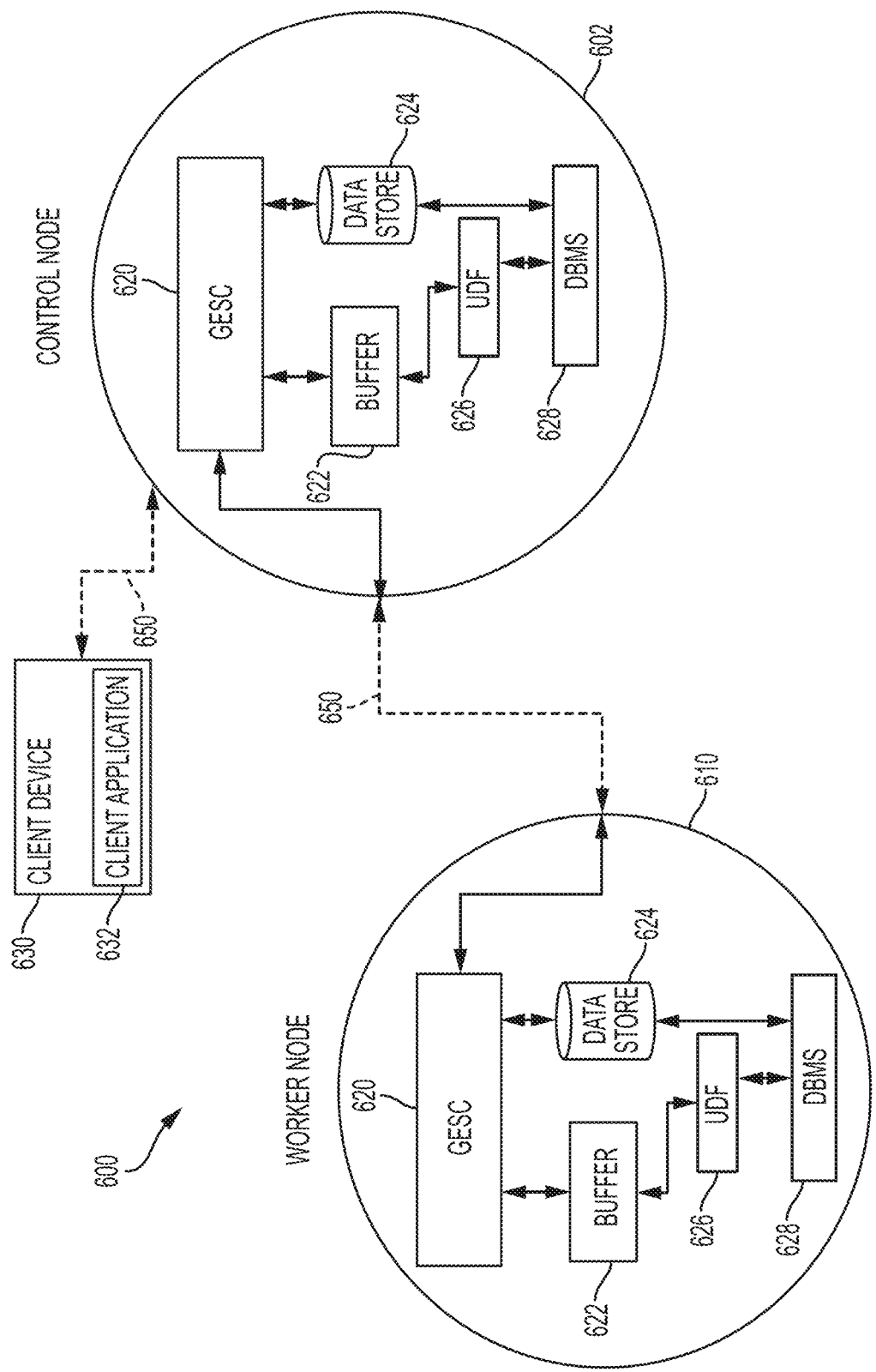
FIG. 6 shows a block diagram of a portion of a communications grid computing system including a control node and a worker node according to some aspects of the present disclosure.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
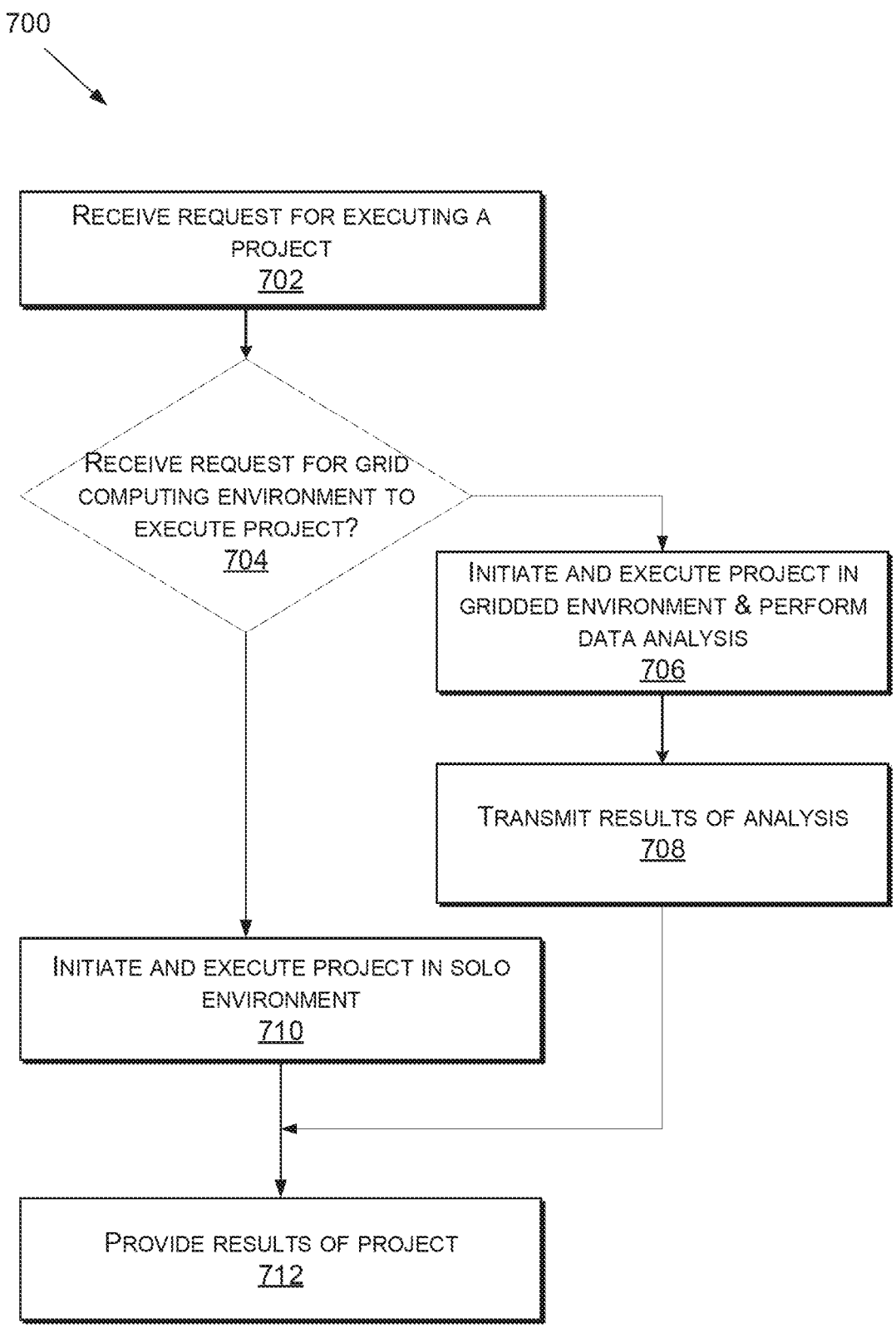
FIG. 7 shows a flow chart of an example of a process for executing a data analysis or processing project according to some aspects of the present disclosure.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
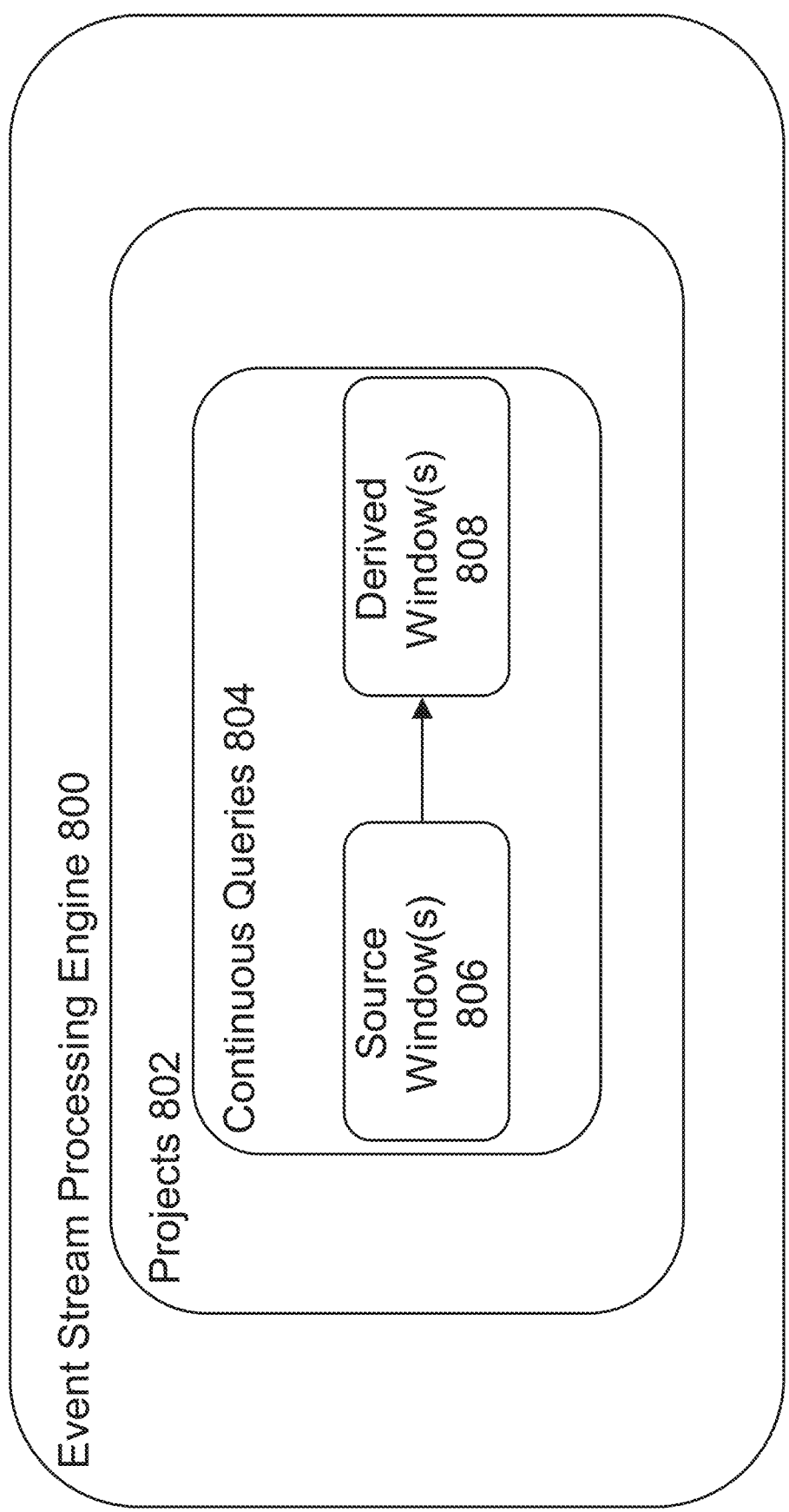
FIG. 8 shows a block diagram including components of an Event Stream Processing Engine (ESPE) according to some aspects of the present disclosure.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
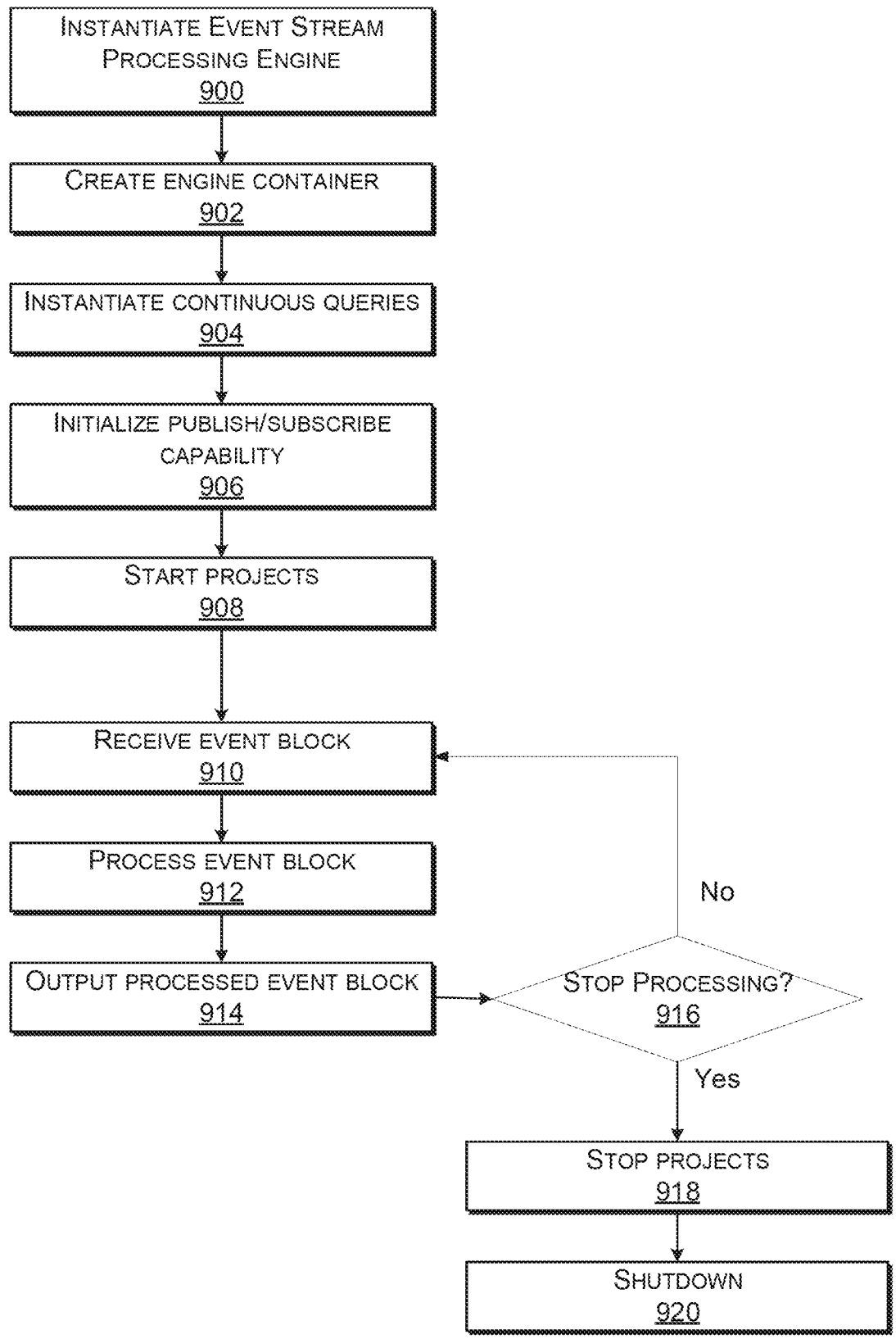
FIG. 9 shows a flow chart of an example of a process including operations performed by an event stream processing engine according to some aspects of the present disclosure.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
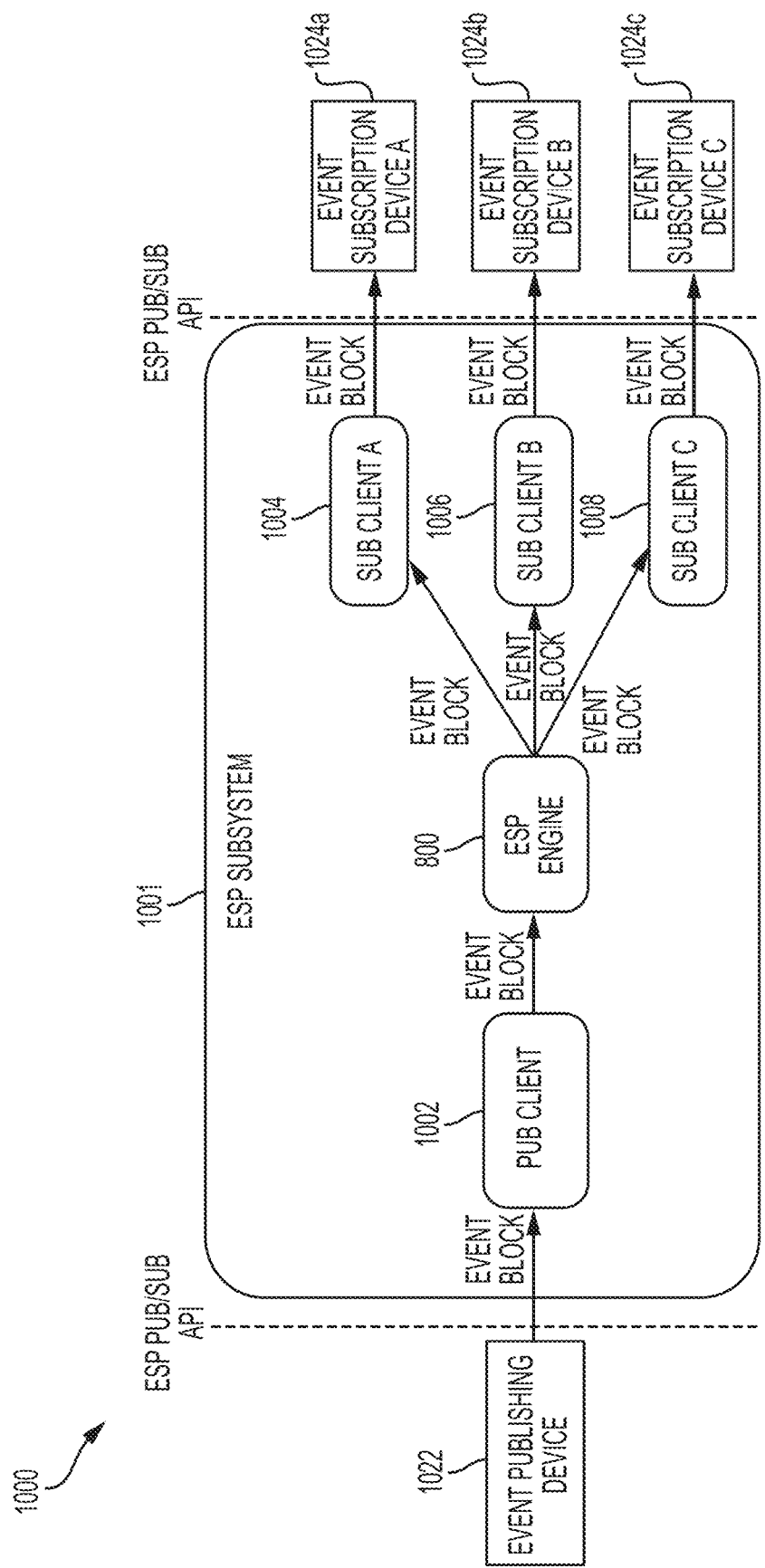
FIG. 10 shows a block diagram of an ESP system interfacing between a publishing device and multiple event subscribing devices according to some aspects of the present disclosure.

FIG. 10 is a block diagram of an ESP system 1000 interfacing between publishing device 1022 and event subscription devices 1024a-c according to some aspects. ESP system 1000 may include ESP subsystem 1001, publishing device 1022, an event subscription device A 1024a, an event subscription device B 1024b, and an event subscription device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024a, event subscription device B 1024b, and event subscription device C 1024c. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024a, event subscription device B 1024b, and event subscription device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024a, event subscription device B 1024b, and event subscription device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024a using the publish/subscribe API. Subscribing client B 1006 may be started by an event subscription application B executing at event subscription device B 1024b using the publish/subscribe API. Subscribing client C 1008 may be started by an event subscription application C executing at event subscription device C 1024c using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
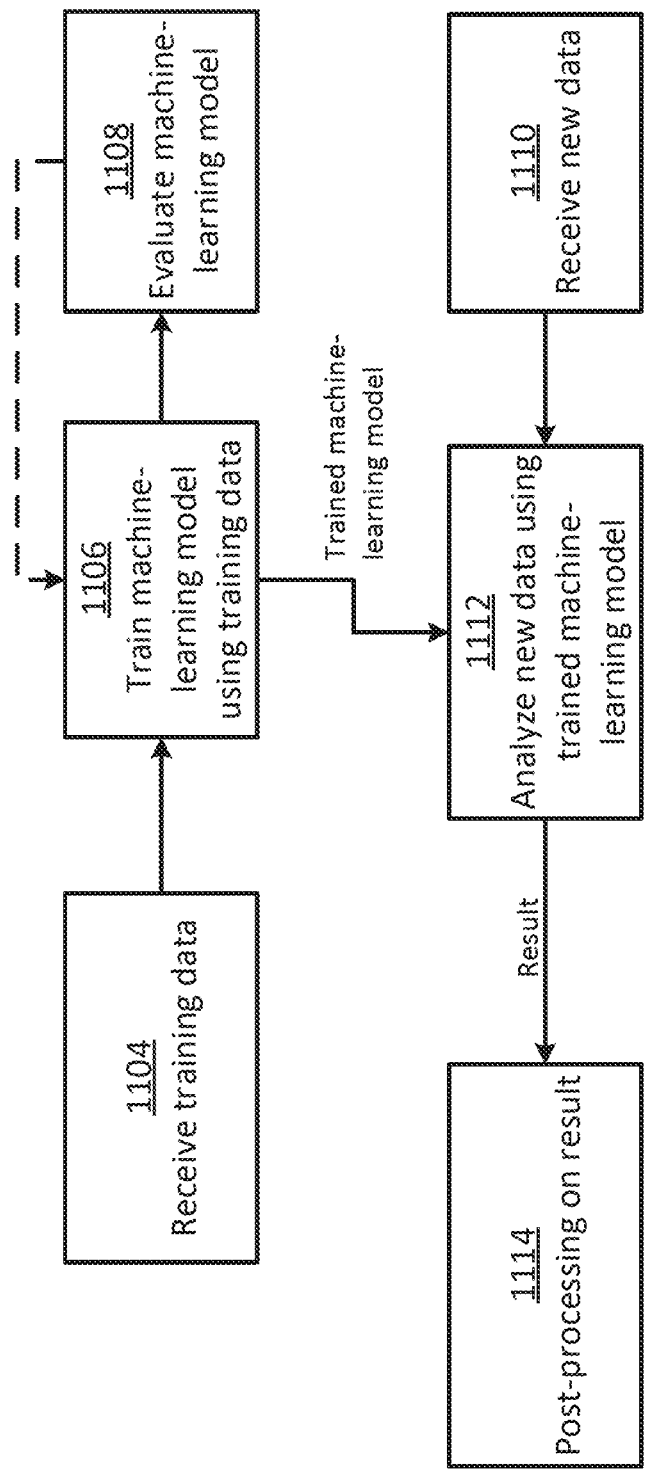
FIG. 11 shows a flow chart of an example of a process for generating and using a machine-learning model according to some aspects of the present disclosure.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and using machine-learning models can include SAS Enterprise Miner (e.g., with the SAS Text Miner add-on), SAS Rapid Predictive Modeler, SAS Model Manager, SAS Cloud Analytic Services (CAS), and SAS Viya (e.g., including Visual Text Analytics and Visual Analytics), all of which are by SAS Institute Inc.® of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. An evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
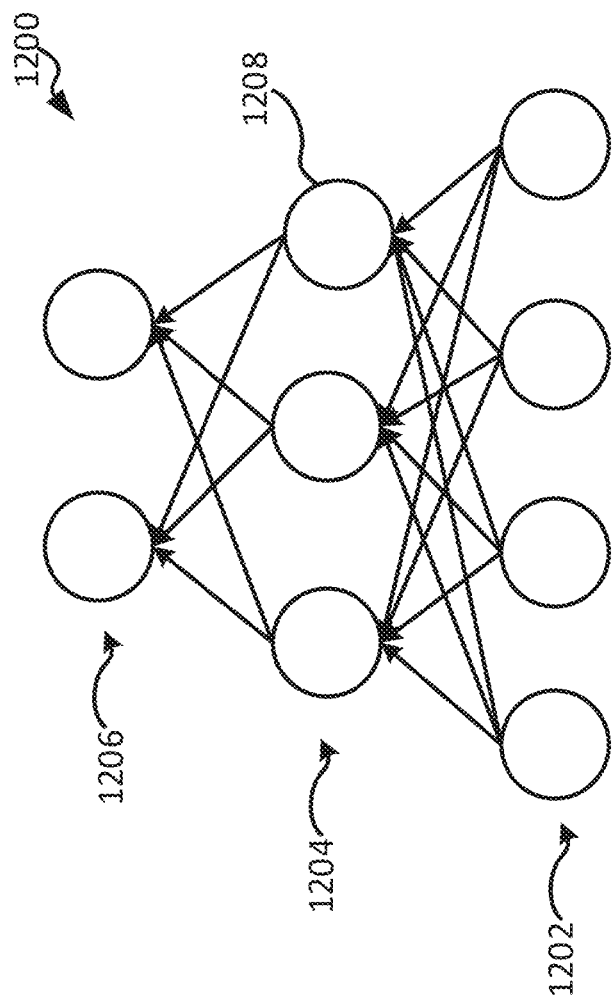
FIG. 12 shows a node-link diagram of an example of a neural network according to some aspects of the present disclosure.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and quickly executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, thermal processing mitigation, processing speed improvements, data communication speed improvements, and/or data efficiency targets and improvements throughout various parts of the system when compared to a homogeneous computing architecture that employs CPUs for general purpose computing.

Figure 13:
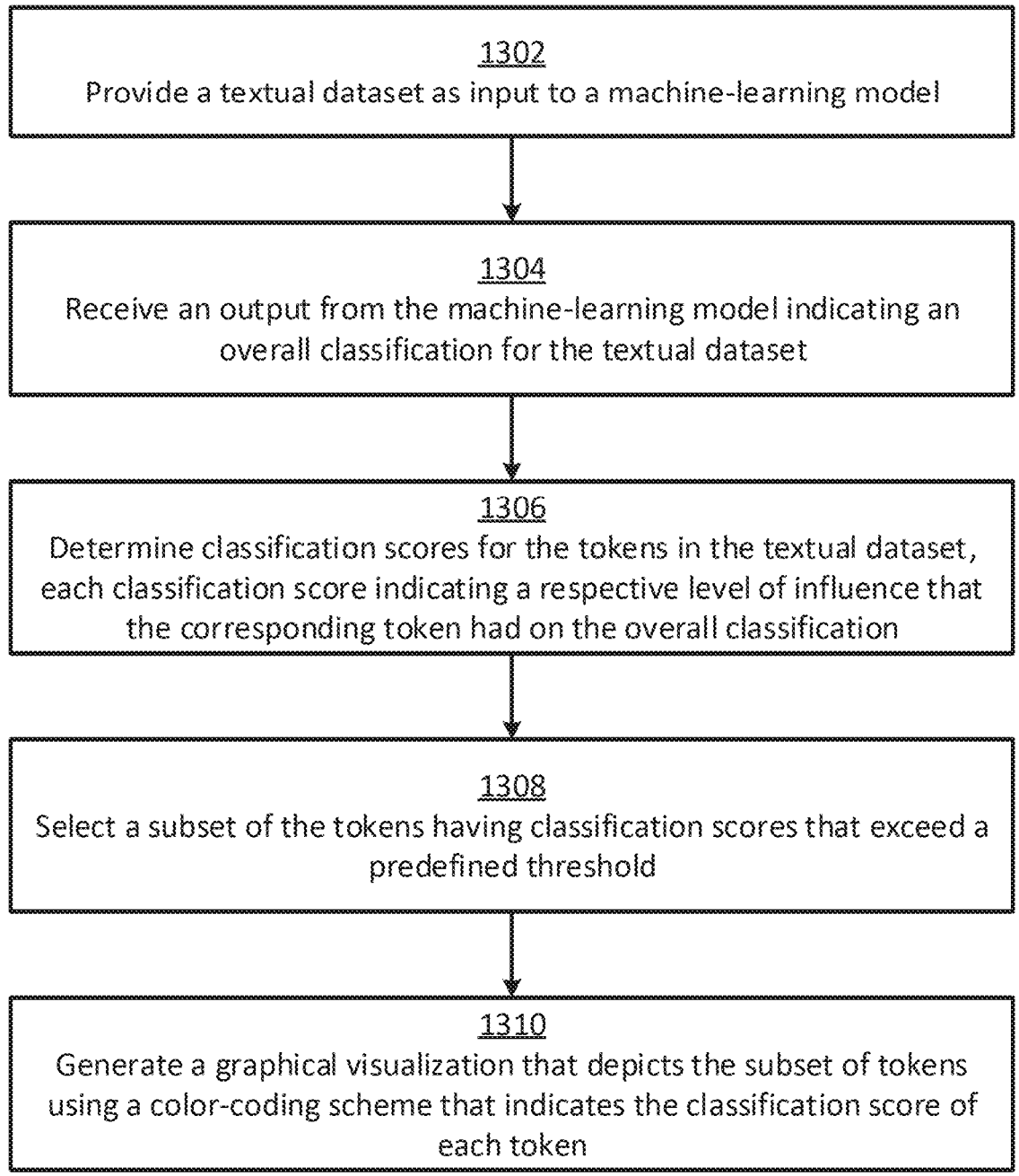
FIG. 13 shows a flow chart of an example of a process for generating a first graphical visualization according to some aspects of the present disclosure.

FIG. 13 shows a flowchart of an example of a process for generating a first graphical visualization according to some aspects of the present disclosure. It will be appreciated that other examples contemplated within the scope of the present disclosure may involve more operations, fewer operations, different operations, or a different order of operations than is shown in FIG. 13.

In block 1302, a processor provides a textual dataset as input to a machine-learning model. In some examples, the textual dataset can be a long document. A document can be any file that includes textual data. A long document can be any document that includes more than 512 tokens. A token can be a word; a subpart of a word (e.g., containing multiple characters); or a punctuation element, such as a period, command, or semicolon. The machine-learning model can be of any suitable type and may have been previously trained using any suitable training technique, such as supervised or unsupervised learning. For example, the machine-learning model can be a transformer model, such as a Bidirectional Encoder Representations from Transformers (BERT) model designed for natural language processing. Other examples of the machine-learning model can include attention models, recurrent neural networks, convolutional neural networks, linear classifiers, or any combination of these.

In block 1304, the processor receives an output from the machine-learning model indicating an overall classification for the textual dataset. For example, the machine-learning model can be a sentiment classifier. So, the machine-learning model can generate an output indicating that the text document has an overall positive sentiment or an overall negative sentiment.

The machine-learning model can provide the output in any suitable format to convey the determined classification. For example, the output may be a numerical value corresponding to the overall classification determined for the textual document—e.g., a 0 for positive sentiment or a 1 for negative sentiment. Alternatively, the output may include one or more probabilities indicating the likelihood that the textual document falls into each of multiple candidate classifications. For instance, the output can be {0.2, 0.8} to indicate that the textual document has a 20% probability of having a negative sentiment and an 80% probability of having a positive sentiment.

Figure 14:
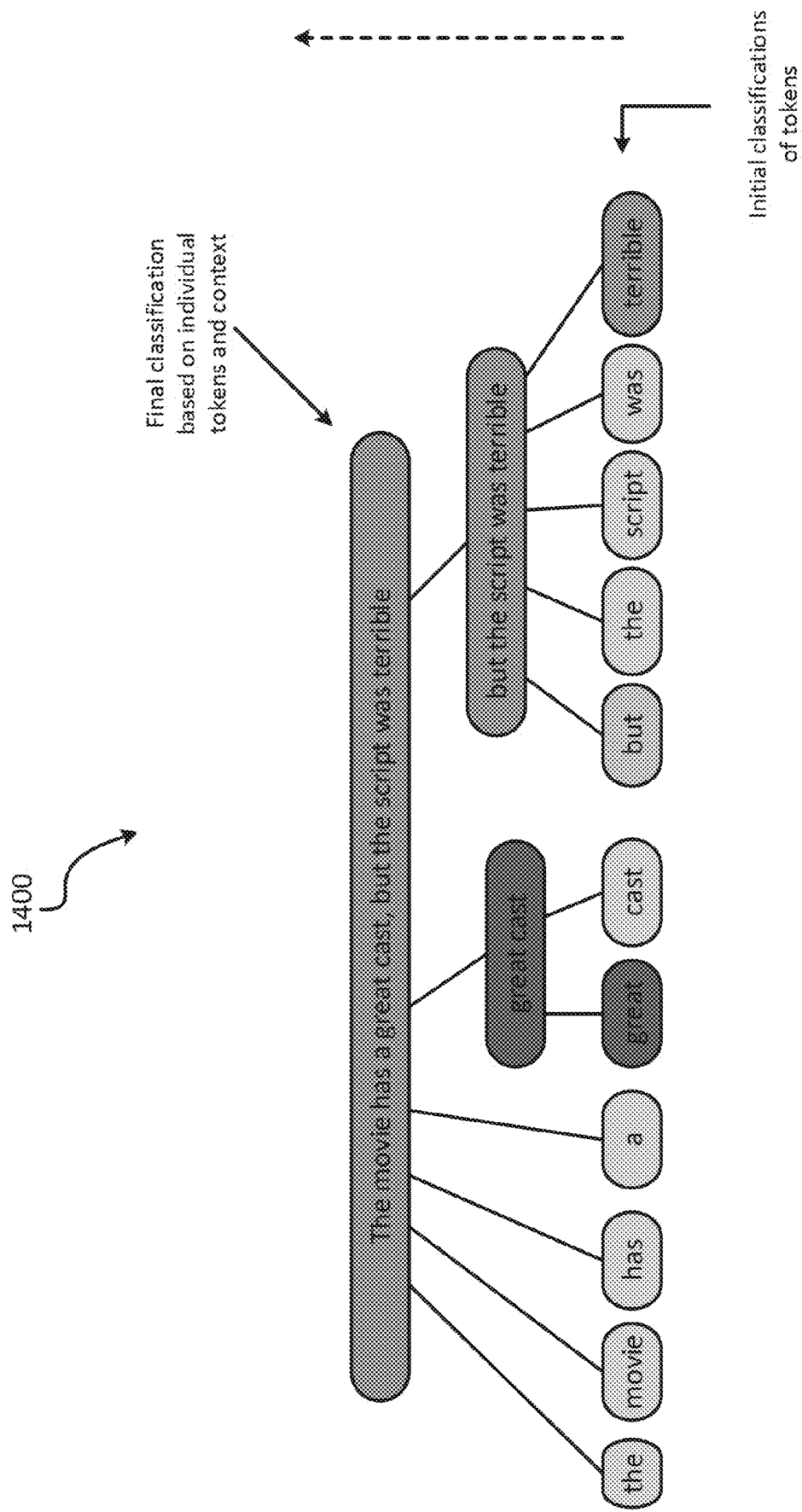
FIG. 14 shows an example of a classification hierarchy derived from tokens from an input textual dataset according to some aspects of the present disclosure.

In addition to generating the above output, the machine-learning model may also generate hierarchical information indicating tokens and combinations of tokens that influenced the model's output. One example of a way to conceptualize the hierarchical information 1400 is shown in FIG. 14. In this example, the machine-learning model can be a sentiment model and the textual dataset can be a movie review that says: "The movie has a great cast, but the script was terrible." Starting at the bottom of the figure, the machine-learning model can begin by determining sentiments for the individual tokens in this sentence. Tokens shown in blue can be categorized as having a negative sentiment, tokens shown in red can be categorized as having a positive sentiment, and tokens shown in gray can be categorized as having a neutral sentiment. Moving upwards in the figure (in the direction of the dashed arrow), more tokens are grouped together and the model becomes more context aware as it converges to its final determination that the overall sentiment of the movie review is negative. It will be appreciated that not all of the tokens in the input textual dataset and combinations thereof contribute to the determination equally. Some tokens and combinations of tokens can move the model against the ultimate determination. Being able to extract the most impactful parts can be insightful to those using and developing the model. The machine-learning model can therefore not only follow this process in determining its final result, but it may also output this hierarchical information for use by others in understanding its underlying decision-making process.

Figure 15:
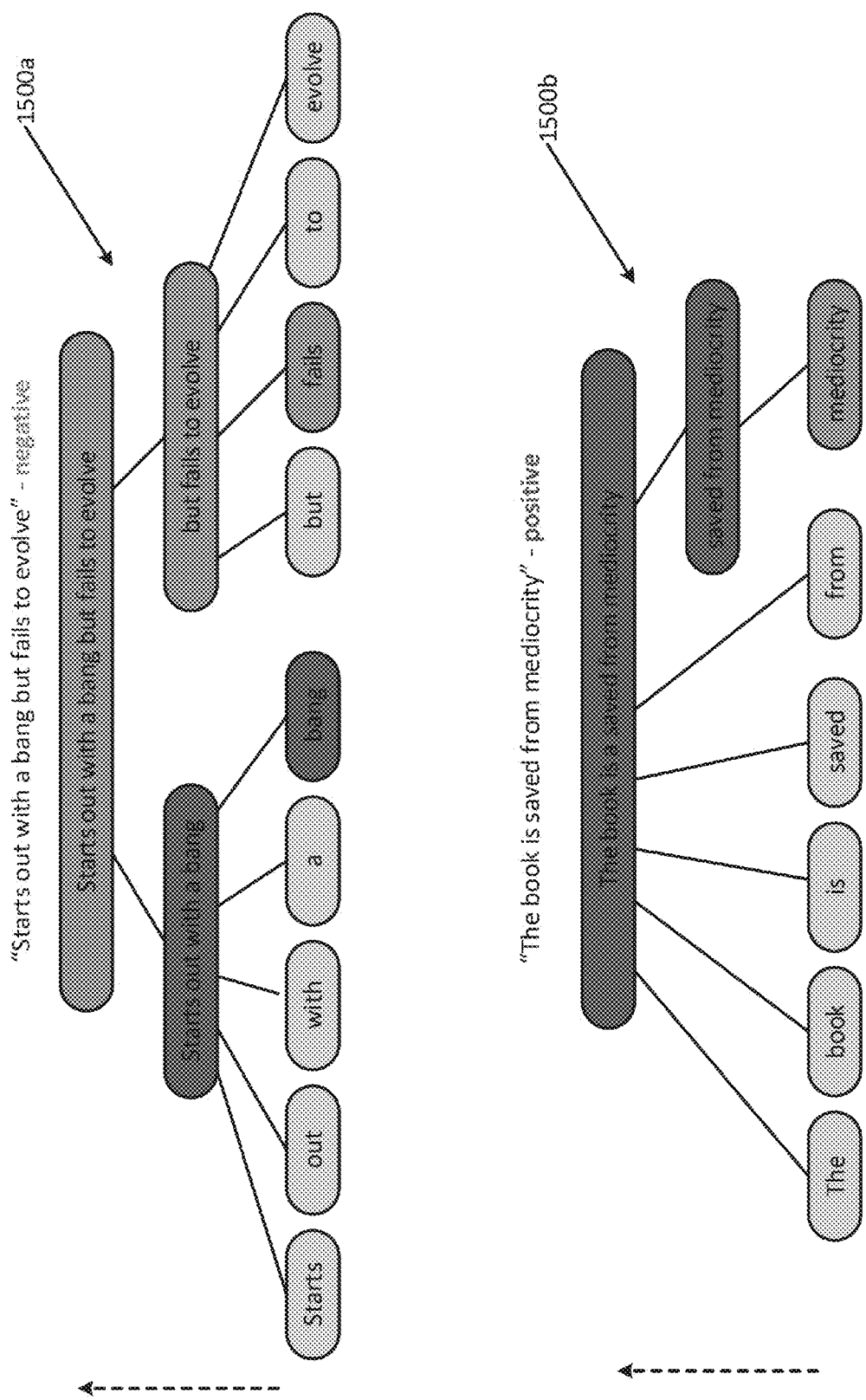
FIG. 15 shows examples of classification hierarchies associated with input textual datasets according to some aspects of the present disclosure.

Two more examples of this process are shown in FIG. 15. The first example is a movie review 1500a with the statement that it "starts out with a bang but fails to evolve." Starting at the bottom of the corresponding dashed arrow, the machine-learning model can begin by determining sentiments for the individual tokens in this sentence. These tokens have the same blue, red, gray color scheme as described above. Moving upwards in the direction of the dashed arrow, more tokens are grouped together, and the model becomes more context aware as it converges to its final determination that the overall sentiment of the movie review is negative. The second example is a book review 1500b with the statement that "The book is saved from mediocrity." Starting at the bottom of the corresponding dashed arrow, the machine-learning model can begin by determining sentiments for the individual tokens in this sentence. Moving upwards in the direction of the dashed arrow, more tokens are grouped together, and the model becomes more context aware as it converges to its final determination that the overall sentiment of the movie review is positive. The machine-learning model can perform this type of hierarchical analysis to arrive at its final classification. In some examples, the machine-learning model can also output some of the corresponding hierarchical information, such as the tokens or groups of tokens in each level of the hierarchy. This hierarchical information can then be used to generate a graphical visualization.

Figure 16:
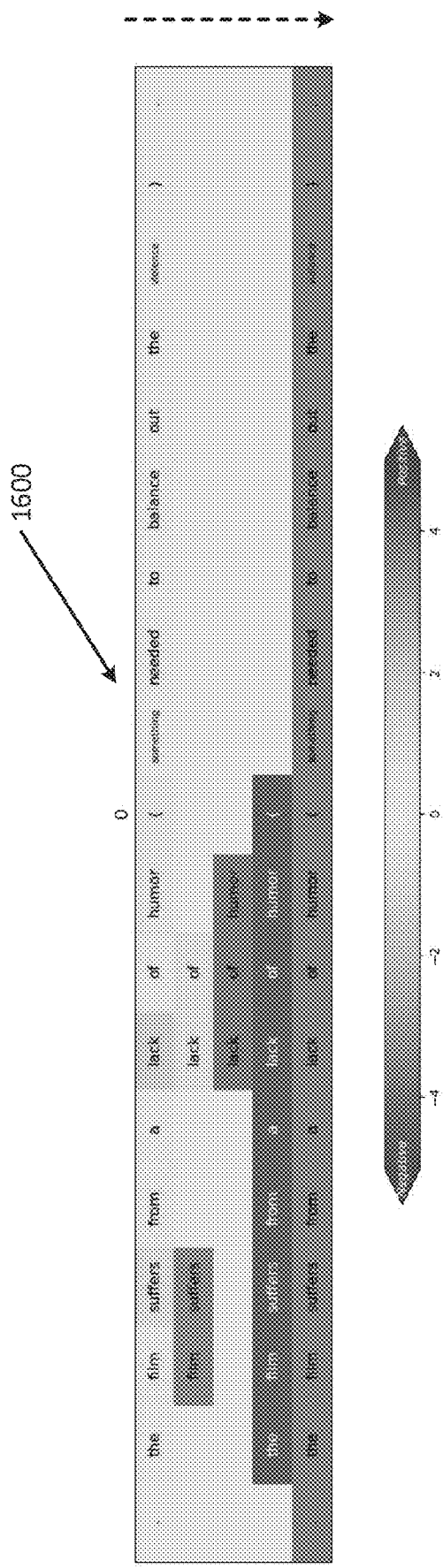
FIG. 16 shows an example of a first graphical visualization that includes a hierarchical structure of tokens that are color-coded based on their influence on a machine-learning model's output according to some aspects of the present disclosure.

If the textual dataset is relatively short, then it may be easier to incorporate the entire textual dataset into a graphical visualization. One example of this is shown in FIG. 16, which includes a graphical visualization 1600 associated with a textual dataset that includes the sentence "the film suffers from a lack of humor (something needed to balance out the violence)." This graphical visualization 1600 can be read from the top down, in the direction of the dashed arrow. The graphical visualization 1600 includes hierarchical information showing which tokens and groups of tokens influenced the machine-learning model's final determination that this textual dataset has a negative sentiment overall. Each level of the hierarchy shows progressively more tokens being grouped together and assigned an overall sentiment until the final result is achieved. The tokens are also color coded to indicate their tendency to push the machine-learning model toward a positive sentiment or a negative sentiment. Tokens that had a higher impact (e.g., weight) on the model's determination one way or the other are shown using darker colors than tokens that had a lower impact on the determination.

If the textual dataset is relatively long, it may be harder to fit the entire textual dataset into one graphical visualization without it becoming too confusing and visually overwhelming for a user. For example, if the textual dataset is a long document with 5000 tokens or more, it may not be possible to cleanly fit all of the tokens into a single visualization that is readily digestible to a user. So, some examples of the present disclosure can help to resolve this issue by using the thresholding mechanism described in blocks 1306-1308.

In block 1306, the processor determines classification scores for the tokens in the textual dataset. Each classification score can correspond to a single token and indicate a level of influence that the token had on the overall classification determined by the machine-learning model. In some examples, the processor can determine the classification scores based on outputs from the machine-learning model. For example, the machine-learning model can output the classification score it assigned to each token. For instance, as part of its internal computations, the machine-learning model may assign the token "hello" a positive classification score (e.g., 0.1) to indicate that it has a positive sentiment. And the machine-learning model may assign the token "boring" a negative classification score (e.g., −0.1) to indicate that it has a negative sentiment. The machine-learning model can then include those numerical classification scores as part of its output, which can be received by the processor.

In block 1308, the processor selects a subset of the tokens (of the textual dataset) that have classification scores exceeding a predefined threshold. To do so, the processor can compare each token's classification score to the predefined threshold to identify which tokens have classification scores that exceed the predefined threshold. In some examples, the predefined threshold may be selected by a user. This can allow the user to customize the level of granularity and visual complexity of the resulting graphical visualization. In other examples, the predefined threshold may be selected in another way. For example, the predefined threshold may be set as the mean value of the classification scores for some or all of the tokens.

Figure 17:
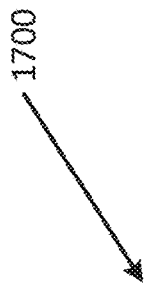
FIG. 17 shows an example of an algorithm for selecting a set of tokens and reducing redundancies in the set of tokens according to some aspects of the present disclosure.

One example of an algorithm 1700 for performing the thresholding process is shown in FIG. 17. The algorithm 1700 accepts 4 inputs: P which corresponds to the hierarchical information, T which corresponds to the tokens, L which corresponds to the overall classification determined by the machine-learning model, and λ which corresponds to the predefined threshold. P is a n-by-m matrix, where n refers to number of hierarchical levels and m refers to the number of tokens. The algorithm 1700 can output the classification scores for the most important features and their corresponding tokens.

More specifically, in lines 1-2 of the algorithm 1700, the output variables are being set. From line 3-6, the algorithm 1700 can perform a simple adjustment to make sure that both negative and positive labels can be summarized properly. In line 7, a loop is initiated that traverses through each of the hierarchical layers. The first hierarchical layer can be used as an initializer, as shown from lines 8-12. In line 9, the algorithm 1700 selects the indices of the positive scores. In line 10, the selected indices are trimmed to meet a certain criterion. Here, the criterion is the mean of the positive scores which put more weights towards the most impactful tokens rather than the ones that affect it negatively or neutrally. In lines 11-12, the scores and tokens for the corresponding indices is saved.

After the first iteration, the algorithm 1700 jumps to lines 14-15, where it can perform the same operation as line 9 for the current and the previous hierarchical layer. In line 16, the indices (which are stored in variable "q2" but not in variable "q1") can be chosen. In this manner, redundancy can be avoided in feature representation. In line 17, the algorithm 1700 performs a similar operation to that of line 10 described above. In lines 18-19, the output is saved.

An important parameter in the algorithm is λ, which is a threshold parameter that controls how much information should be included in the output summarization. By choosing larger λ, the threshold is increased which can result in the identification and inclusion of fewer tokens in the final summarization. By choosing a smaller λ, the threshold is decreased which can result in the identification and inclusion of a larger number of tokens in the final summarization. In some examples, a suitable range for λ can be between the minimum value and the maximum value in P, to ensure that the multiplication in lines 10 and 17 do not exceed the minimum and maximum values. Anything outside this range may be undesirable. For example, if λ is larger than the maximum value of P, no information will be included in the summarization, which defeats the purpose of the summarization. And if λ is smaller than the minimum value of P, all the tokens (except the iterative tokens) in the entire hierarchy tree will be included in the summarization, which also defeats the purpose of the summarization.

Figure 18:
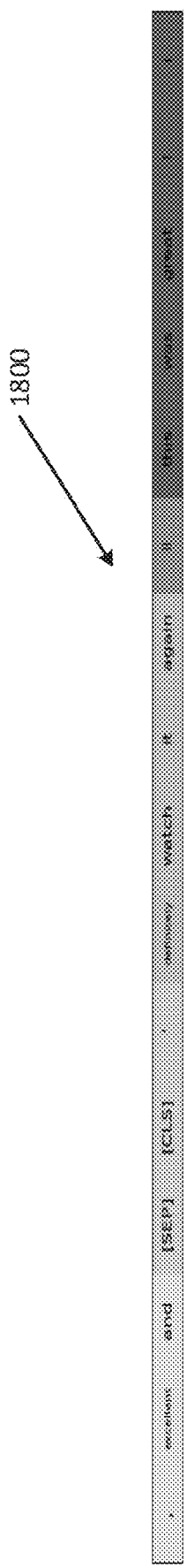
FIG. 18 shows an example of a set of tokens selected from a larger textual dataset using the algorithm of FIG. 17 according to some aspects of the present disclosure.

An example of an output 1800 from the algorithm 1700 is shown in FIG. 18. As shown, the output 1800 includes only the most important tokens (with respect to a machine-learning model's decision-making process) from a long document, with repetitions removed. This output 1800 includes 16 tokens, which can be significantly fewer than the hundreds of tokens that may be present in the long document. Thus, using this thresholding technique can allow the system to focus on the most important tokens and avoid inundating the user with an overwhelming amount of information and corresponding visual clutter.

Figure 19:
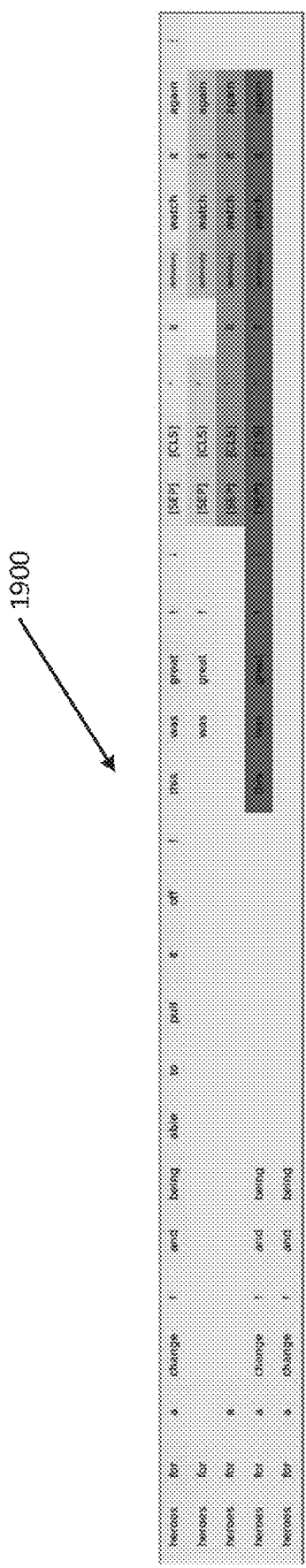
FIG. 19 shows an example of a first graphical visualization that includes a hierarchical structure of tokens that are color-coded based on their influence on a machine-learning model's output according to some aspects of the present disclosure.

Continuing with FIG. 13, in block 1310 the processor generates a graphical visualization that depicts the subset of tokens using a color-coding scheme. The color-coding scheme may be any suitable color coding that indicates the classification score of each token. The subset of tokens may also be spatially arranged in the graphical visualization based on their hierarchical location in the hierarchical tree. One example of such a graphical visualization 1900 is shown in FIG. 19. This graphical visualization 1900 only depicts a subpart of the input textual dataset, particularly the subpart with the most influential tokens on the final determination made by the machine-learning model. The tokens are color coded from light red to dark red to show their relative influence on the final determination. The tokens are also organized in a hierarchical structure, where each level shows a progressively larger combination of tokens that led to the final determination by the machine-learning model. This can help the user understand the logical process by which the machine-learning model arrived at its final determination and the most influential tokens on that determination.

Figure 20:
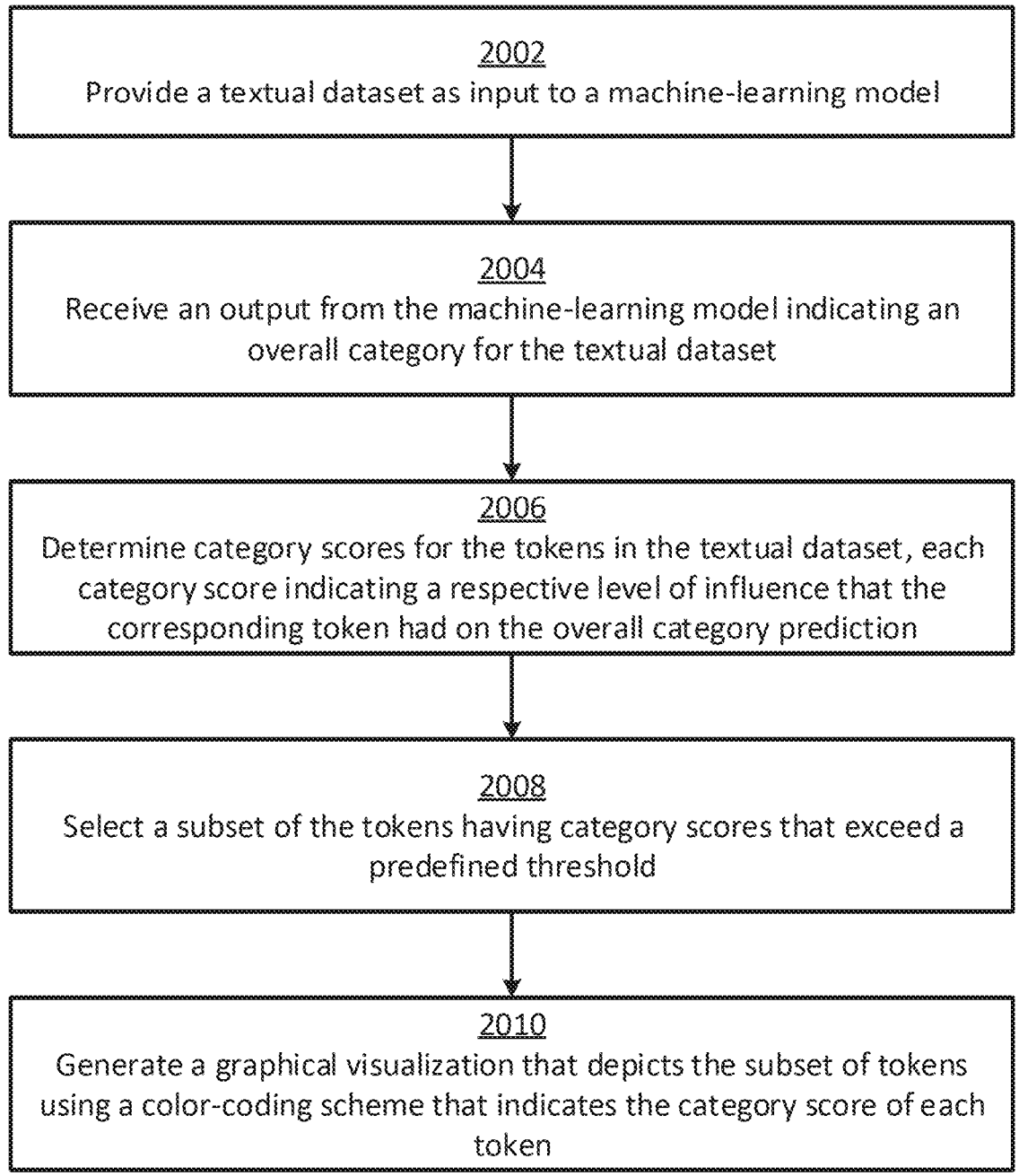
FIG. 20 shows a flow chart of an example of a process for generating a second graphical visualization according to some aspects of the present disclosure.

While a first type of graphical visualization is described above, some examples may additionally or alternatively involve a second type of graphical visualization. The second type of graphical visualization may be output concurrently with, or separately from, the first visualization described above. One example of an example of a process for generating the second graphical visualization is shown in FIG. 20. It will be appreciated that other examples contemplated within the scope of the present disclosure may involve more operations, fewer operations, different operations, or a different order of operations than is shown in FIG. 20.

In block 2002, a processor provides a textual dataset as input to a machine-learning model. The textual dataset can be a long document, which can be any text document that includes more than 512 tokens. The machine-learning model can be of any suitable type and may have been previously trained using any suitable training technique, such as supervised or unsupervised learning. For example, the machine-learning model can be a transformer model, such as a Bidirectional Encoder Representations from Transformers (BERT) model designed for natural language processing. Other examples of the machine-learning model can include linear classifiers, recurrent neural networks, or any combination of these. The machine-learning model may be the same as, or different from, the machine-learning model used in block 1302 of FIG. 13.

In block 2004, the processor receives an output from the machine-learning model indicating an overall category for the textual dataset. For example, the machine-learning model can be a topic classifier. So, the machine-learning model can generate an output indicating that the text dataset describes a particular topic, such as software, electronics, biology, and chemistry.

Figure 21:
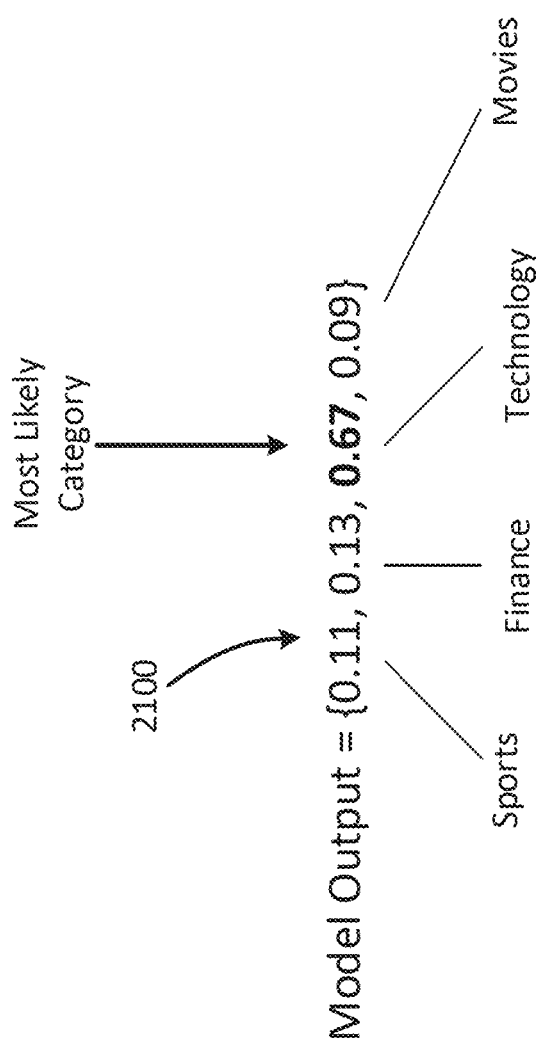
FIG. 21 shows an example of a model output according to some aspects of the present disclosure.

The machine-learning model can provide the output in any suitable format to convey the determined category. For example, referring now to FIG. 21, the output from the machine-learning model may include a set of probabilities 2100. Each probability in the set can corresponding to an individual category and indicate a likelihood of the textual dataset falling into that category. In the example shown in FIG. 21, the output includes four probability values corresponding to the topics "sports," "finance," "technology," and "movies." The first probability indicates that there is an 11% likelihood that the textual dataset falls into the sports category. The second probability indicates that there is a 13% likelihood that the textual dataset falls into the finance category. The third probability indicates that there is a 67% likelihood that the textual dataset falls into the technology category. This is the highest probability in the set and, therefore, the "technology" topic is the most likely topic for the textual dataset. The fourth probability indicates that there is a 9% likelihood that the textual dataset falls into the movies category. But of course, other examples may have a larger or smaller number of probability values corresponding to a larger or smaller number of category options.

If the textual dataset is relatively short, then it may be easier to incorporate the entire textual dataset into a graphical visualization without it becoming too visually cluttered. If the textual dataset is relatively long, it may be harder to fit the entire textual dataset into one visualization without it being too confusing and overwhelming for the user. So, some examples of the present disclosure can help to resolve this issue by using the thresholding mechanism described in blocks 2006-2008.

In block 2006, the processor determines category scores for the tokens in the textual dataset. Each category score can correspond to a single token and indicate a level of influence that the token had on the overall category determined by the machine-learning model. In some examples, the processor can determine the category scores based on outputs from the machine-learning model.

In some examples, the machine-learning model can output the category it assigned to each token along with a corresponding score for that category. For instance, as part of its internal computations, the machine-learning model may assign the token "action" to a movie category and assign that token a corresponding category score, which can represent the probability that the token falls into the movie category. And the machine-learning model may assign the token "circuit" to an electronics category and assign that token a corresponding category score, which can represent the probability that the token falls into the electronics category. The machine-learning model can then include those category scores as part of its output, which can be received by the processor.

Figure 22:
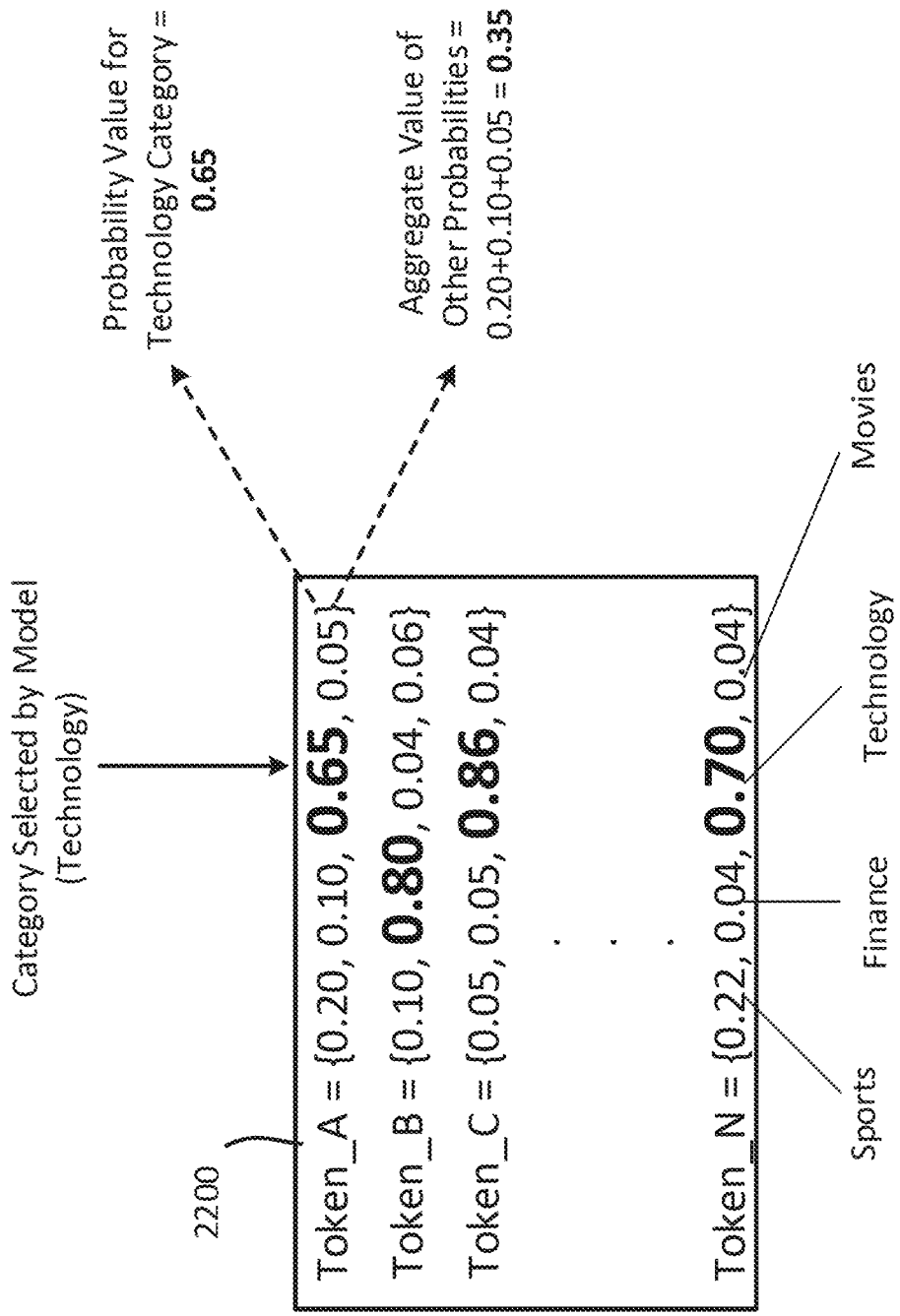
FIG. 22 shows an example of probability sets assigned to tokens according to some aspects of the present disclosure.

In some examples, the machine-learning model can output a group of probabilities for each token in the textual dataset, where the group of probabilities indicates the likelihood of the token corresponding to each category option. For example, as shown in FIG. 22, the output 2200 from the machine-learning model can include four probability values for each token. The four probability values can correspond to the topics "sports," "finance," "technology," and "movies." Each probability value can indicate the likelihood that the token corresponds to one of those four categories. The highest probability values in each probability group are shown in bold. For example, the highest probability value for Token_A is 0.65. The highest probability value for Token_B is 0.85. The highest probability value for Token_C is 0.86. And so on. Because the highest probability values for Tokens A, C, and N correspond the overall category (technology) that was selected by the machine-learning model, those three tokens tended to push the machine-learning model toward that final determination. Conversely, because the highest probability value for Token B corresponds to another topic (finance), that token tended to push the machine-learning model away from the "technology" category.

In some examples, the processor can determine the probability value assigned to each token that corresponds to the overall category (e.g., technology) selected by the machine-learning model. The processor can store this probability value in memory. The remainder of the probabilities can correspond to the other, unchosen categories. The processor can aggregate those remaining probabilities together into a single value that can be stored in memory. One example of this process is depicted on the right-hand side of FIG. 22. As shown, the processor can determine that the probability value associated with Token A for the technology category is 0.65. The processor can then combine the remainder of the probability values to determine an aggregate probability value of 0.20+0.10+0.05=0.35. The processor can then store the 0.65 and 0.35 values in memory with respect to Token_A for use in subsequent operations, for example to select a subset of the tokens in block 2008 or to select a color-coding for each token in block 2010. The processor can then repeat a similar process for each token based on its corresponding probability values.

Continuing with FIG. 20, in block 2008 the processor selects a subset of the tokens (of the textual dataset) that have category scores exceeding a predefined threshold. To do so, the processor can compare each token's category score to the predefined threshold to identify which tokens have category scores that exceed the predefined threshold. In some examples, the predefined threshold may be selected by a user, which can allow the user to customize the level of granularity of the resulting graphical visualization. In other examples, the predefined threshold may be selected in another way. For example, the predefined threshold may be set as the mean value of the category scores for some or all of the tokens. Once the threshold has been determined, in some examples the processor can apply an algorithm similar to the one in FIG. 17 to select the subset of tokens.

Figure 23:
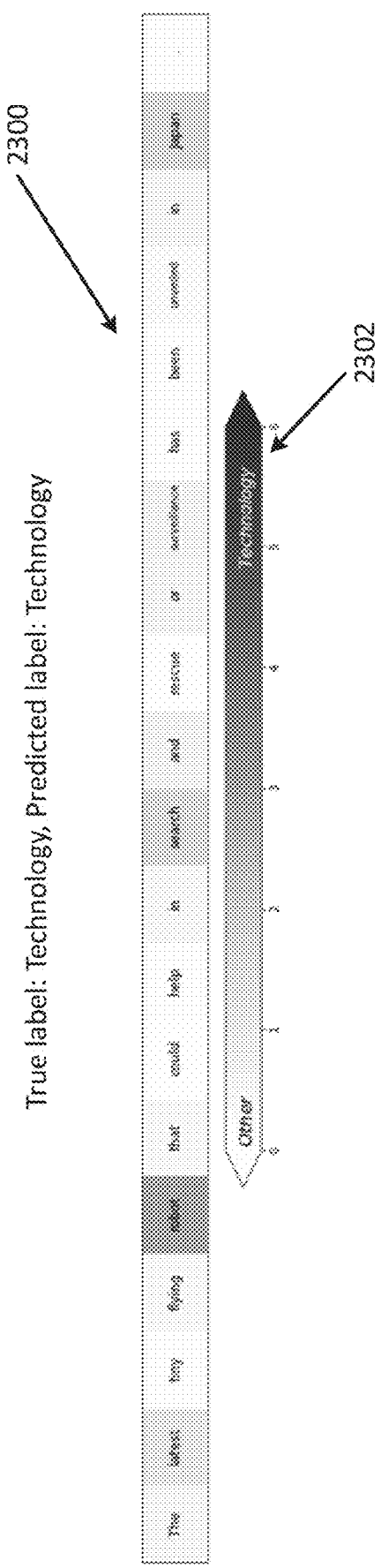
FIG. 23 shows an example of a second graphical visualization that depicts tokens color-coded based on their influence on a machine-learning model's output according to some aspects of the present disclosure.

In block 2010, the processor generates a graphical visualization that depicts the subset of tokens using a color-coding scheme. The color-coding scheme may be any suitable color coding that indicates the category score of each token. One example of such a graphical visualization 2300 is shown in FIG. 23. In this example, the graphical visualization 2300 only depicts a subpart of the textual dataset, particularly the subpart with the most influential tokens on the final category determination made by the machine-learning model. The tokens are color coded from light white to dark purple to show their relative influence on the final determination. Of course, other color schemes may be used in other examples. The graphical visualization 2300 can help the user quickly and easily understand the most influential tokens on the machine-learning model's category determination.

In some cases, there may be large number (e.g., 20) of category options that could overwhelm a user if each category is assigned its own color in the color-coding scheme. To help alleviate this cognitive burden, in some examples the color coding can be configured such that a first color represents the overall category selected by the machine-learning model and a second color represents all other categories combined. A category score for each token can then be computed to fall along this spectrum. An example of such a spectrum 2302 is shown in FIG. 23. To compute the category scores along this spectrum, the processor can determine a category score for a given token can based on (i) its particular probability value corresponding to the overall topic selected by the machine-learning model and (ii) its aggregate probability value computed from the remainder of the probability values, as described above with respect to FIG. 22. For instance, a given token may have a particular probability value of 0.65 corresponding to a technology category. That token may also have an aggregate probability value of 0.35 corresponding to all of the other unselected categories. So, the processor can compute the token's category score by subtracting the aggregate probability value from the particular probability value, e.g., 0.65−0.35=0.30. This may be the category score used to position the token along the color spectrum. That is, the value of 0.30 may correspond to a particular color along the color spectrum, so the processor may assign that color to the token in the graphical visualization.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:
1. A system comprising:
one or more processors; and
one or more memories including program code that is executable by the one or more processors for causing the one or more processors to:
provide a textual dataset as input to a first machine-learning model, the first machine-learning model being configured to analyze the textual dataset and generate a first output indicating an overall classification for the textual dataset;
determine a plurality of classification scores for a plurality of tokens in the textual dataset, each token in the plurality of tokens being assigned a respective classification score indicating a respective level of influence that the token had on the overall classification from the first machine-learning model;
select a first subset of tokens from among the plurality of tokens based on the plurality of classification scores, each token in the first subset of tokens being selected based on the respective classification score corresponding to the token being greater than a first predefined threshold;
provide the textual dataset as input to a second machine-learning model, the second machine-learning model being configured to analyze the textual dataset and generate a second output including a plurality of probabilities, each probability of the plurality of probabilities indicating a respective likelihood that the textual dataset relates to a respective category of a plurality of categories, wherein the plurality of probabilities includes a highest probability value indicating a most likely category associated with the textual dataset, and wherein the second output from the second machine-learning model includes a plurality of probability sets corresponding to the plurality of tokens, each respective probability set corresponding to a respective token of the plurality of tokens and including respective probabilities that the respective token falls into each category of the plurality of categories;
determine a plurality of category scores for the plurality of tokens, each token in the plurality of tokens being assigned a respective category score indicating a respective level of influence that the token had on the most likely category determined by the second machine-learning model;

select a second subset of tokens from among the plurality of tokens based on the plurality of category scores, each token in the second subset of tokens being selected based on the respective category score corresponding to the token being greater than a second predefined threshold;

for each token in the second subset of tokens:
determine a particular probability value that is associated with the most likely category from among the respective probabilities corresponding to the token;
determine an aggregate probability value by aggregating together a remainder of the respective probabilities corresponding to the token, the remainder of the respective probabilities excluding the particular probability value; and
select a color coding for the token based on the particular probability value or the aggregate probability value; and generate a graphical user interface including:
a first graphical visualization that depicts the first subset of tokens using a color-coding scheme that indicates the respective classification score of each token in the first subset of tokens; and
a second graphical visualization that depicts the second subset of tokens using the color coding selected for each token in the second subset of tokens.

2. The system of claim 1, wherein the first output from the first machine-learning model includes the plurality of classification scores.

3. The system of claim 1, wherein the second output from the second machine-learning model includes the plurality of category scores, and wherein the second machine-learning model is different from the first machine-learning model.

4. The system of claim 1, wherein the one or more memories further include program code that is executable by the one or more processors for causing the one or more processors to determine the first predefined threshold based on a mean of the plurality of classification scores.

5. The system of claim 1, wherein the one or more memories further include program code that is executable by the one or more processors for causing the one or more processors to output the first graphical visualization concurrently with the second graphical visualization.

6. The system of claim 1, wherein the one or more memories further include program code that is executable by the one or more processors for causing the one or more processors to:
parse the textual dataset into a plurality of hierarchical levels using the first machine-learning model; and
determine the first subset of tokens based on their hierarchical position in the plurality of hierarchical levels.

7. The system of claim 1, wherein the first subset of tokens and the second subset of tokens are proper subsets of the plurality of tokens.

8. The system of claim 1, wherein the plurality of tokens includes more than 512 tokens.

9. The system of claim 1, wherein:
the plurality of classification scores are a plurality of sentiment scores;
the overall classification is an overall sentiment for the textual dataset;
the plurality of categories are a plurality of topics;
the plurality of category scores are a plurality of topic scores; and
the most likely category is a most likely topic associated with the textual dataset.

10. A method comprising:
providing, by one or more processors, a textual dataset as input to a first machine-learning model, the first machine-learning model being configured to analyze the textual dataset and generate a first output indicating an overall classification for the textual dataset;
determining, by the one or more processors, a plurality of classification scores for a plurality of tokens in the textual dataset, each token in the plurality of tokens being assigned a respective classification score indicating a respective level of influence that the token had on the overall classification from the first machine-learning model;
selecting, by the one or more processors, a first subset of tokens from among the plurality of tokens based on the plurality of classification scores, each token in the first subset of tokens being selected based on the respective classification score corresponding to the token being greater than a first predefined threshold;
providing, by the one or more processors, the textual dataset as input to a second machine-learning model, the second machine-learning model being configured to analyze the textual dataset and generate a second output including a plurality of probabilities, each probability of the plurality of probabilities indicating a respective likelihood that the textual dataset relates to a respective category of a plurality of categories, wherein the plurality of probabilities includes a highest probability value indicating a most likely category associated with the textual dataset, and wherein the second output from the second machine-learning model includes a plurality of probability sets corresponding to the plurality of tokens, each respective probability set corresponding to a respective token of the plurality of tokens and including respective probabilities that the respective token falls into each category of the plurality of categories;
determining, by the one or more processors, a plurality of category scores for the plurality of tokens, each token in the plurality of tokens being assigned a respective category score indicating a respective level of influence that the token had on the most likely category determined by the second machine-learning model;
selecting, by the one or more processors, a second subset of tokens from among the plurality of tokens based on the plurality of category scores, each token in the second subset of tokens being selected based on the respective category score corresponding to the token being greater than a second predefined threshold;
for each token in the second subset of tokens:
determining, by the one or more processors, a particular probability value that is associated with the most likely category from among the respective probabilities corresponding to the token;
determining, by the one or more processors, an aggregate probability value by aggregating together a remainder of the respective probabilities corresponding to the token, the remainder of the respective probabilities excluding the particular probability value; and
selecting, by the one or more processors, a color coding for the token based on the particular probability value or the aggregate probability value; and generating, by the one or more processors, a graphical user interface including:
- a first graphical visualization that depicts the first subset of tokens using a first color-coding scheme that indicates the respective classification score of each token in the first subset of tokens; and
- a second graphical visualization that depicts the second subset of tokens using the color coding selected for each token in the second subset of tokens.

11. The method of claim 10, wherein the first output from the first machine-learning model includes the plurality of classification scores.

12. The method of claim 10, wherein the second output from the second machine-learning model includes the plurality of category scores, and wherein the second machine-learning model is different from the first machine-learning model.

13. The method of claim 10, further comprising determining the first predefined threshold based on a mean of the plurality of classification scores.

14. The method of claim 10, further comprising outputting the first graphical visualization concurrently with the second graphical visualization.

15. The method of claim 10, further comprising:
parsing the textual dataset into a plurality of hierarchical levels using the first machine-learning model; and
determining the first subset of tokens based on their hierarchical position in the plurality of hierarchical levels.

16. The method of claim 10, wherein the first subset of tokens and the second subset of tokens are proper subsets of the plurality of tokens.

17. The method of claim 10, wherein the plurality of tokens includes more than 512 tokens.

18. The method of claim 10, wherein:
the plurality of classification scores are a plurality of sentiment scores;
the overall classification is an overall sentiment for the textual dataset;
the plurality of categories are a plurality of topics;
the plurality of category scores are a plurality of topic scores; and
the most likely category is a most likely topic associated with the textual dataset.

19. A non-transitory computer-readable medium comprising program code that is executable by one or more processors for causing the one or more processors to:
provide a textual dataset as input to a first machine-learning model, the first machine-learning model being configured to analyze the textual dataset and generate a first output indicating an overall classification for the textual dataset;
determine a plurality of classification scores for a plurality of tokens in the textual dataset, each token in the plurality of tokens being assigned a respective classification score indicating a respective level of influence that the token had on the overall classification determined by the first machine-learning model;
select a first subset of tokens from among the plurality of tokens based on the plurality of classification scores, each token in the first subset of tokens being selected based on the respective classification score corresponding to the token being greater than a first predefined threshold;
provide the textual dataset as input to a second machine-learning model, the second machine-learning model being configured to analyze the textual dataset and generate a second output including a plurality of probabilities, each probability of the plurality of probabilities indicating a respective likelihood that the textual dataset relates to a respective category of a plurality of categories, wherein the plurality of probabilities includes a highest probability value indicating a most likely category associated with the textual dataset, and wherein the second output from the second machine-learning model includes a plurality of probability sets corresponding to the plurality of tokens, each respective probability set corresponding to a respective token of the plurality of tokens and including respective probabilities that the respective token falls into each category of the plurality of categories;
determine a plurality of category scores for the plurality of tokens, each token in the plurality of tokens being assigned a respective category score indicating a respective level of influence that the token had on the most likely category determined by the second machine-learning model;
select a second subset of tokens from among the plurality of tokens based on the plurality of category scores, each token in the second subset of tokens being selected based on the respective category score corresponding to the token being greater than a second predefined threshold;
for each token in the second subset of tokens:
- determine a particular probability value that is associated with the most likely category from among the respective probabilities corresponding to the token;
- determine an aggregate probability value by aggregating together a remainder of the respective probabilities corresponding to the token, the remainder of the respective probabilities excluding the particular probability value; and
- select a color coding for the token based on the particular probability value or the aggregate probability value; and generate a graphical user interface including:
- a first graphical visualization that depicts the first subset of tokens using a first color-coding scheme that indicates the respective classification score of each token in the first subset of tokens; and
- a second graphical visualization that depicts the second subset of tokens using the color coding selected for each token in the second subset of tokens.

20. The non-transitory computer-readable medium of claim 19, wherein the first output from the first machine-learning model includes the plurality of classification scores.

21. The non-transitory computer-readable medium of claim 19, wherein the second output from the second machine-learning model includes the plurality of category scores, and wherein the second machine-learning model is different from the first machine-learning model.

22. The non-transitory computer-readable medium of claim 19, further comprising program code that is executable by the one or more processors for causing the one or more processors to output the first graphical visualization concurrently with the second graphical visualization.

23. The non-transitory computer-readable medium of claim 19, further comprising program code that is executable by the one or more processors for causing the one or more processors to:
parse the textual dataset into a plurality of hierarchical levels using the first machine-learning model; and
determine the first subset of tokens based on their hierarchical position in the plurality of hierarchical levels.

24. The non-transitory computer-readable medium of claim 19, further wherein:
- the plurality of classification scores are a plurality of sentiment scores;
- the overall classification is an overall sentiment for the textual dataset;
- the plurality of categories are a plurality of topics;
- the plurality of category scores are a plurality of topic scores; and
- the most likely category is a most likely topic associated with the textual dataset.

25. The system of claim 1, wherein the one or more memories further include program code that is executable by the one or more processors for causing the one or more processors to:
- select the second subset of tokens using an algorithm that accepts as inputs (i) hierarchical information, and (ii) a threshold parameter associated with the second predefined threshold;
- wherein the hierarchical information includes a n-by-m matrix, wherein n corresponds to a number of hierarchical levels associated with the textual dataset, and wherein m corresponds to a number of tokens in the plurality of tokens.

26. The system of claim 25, wherein the algorithm is configured to perform a plurality of iterations, each iteration of the plurality of iterations corresponding to a respective hierarchical level expressed in the matrix and involving:
- identifying one or more tokens, from of the plurality of tokens, corresponding to the respective hierarchical level;
- determining whether each category score for each token of the identified one or more tokens is greater than the second predefined threshold, wherein the second predefined threshold corresponds to a product of (i) the threshold parameter and (ii) a mean of multiple category scores; and
- incorporating, into the second subset of tokens, each token of the identified one or more tokens that has a corresponding category score above the second predefined threshold.

27. The method of claim 10, further comprising selecting the second subset of tokens using an algorithm that accepts as inputs (i) hierarchical information, and (ii) a threshold parameter associated with the second predefined threshold;
- wherein the hierarchical information includes a n-by-m matrix, wherein n corresponds to a number of hierarchical levels associated with the textual dataset, and wherein m corresponds to a number of tokens in the plurality of tokens.

28. The method of claim 27, wherein the algorithm is configured to perform a plurality of iterations, each iteration of the plurality of iterations corresponding to a respective hierarchical level expressed in the matrix and involving:
- identifying one or more tokens, from of the plurality of tokens, corresponding to the respective hierarchical level;
- determining whether each category score for each token of the identified one or more tokens is greater than the second predefined threshold, wherein the second predefined threshold corresponds to a product of (i) the threshold parameter and (ii) a mean of multiple category scores; and
- incorporating, into the second subset of tokens, each token of the identified one or more tokens that has a corresponding category score above the second predefined threshold.

29. The non-transitory computer-readable medium of claim 19, further comprising program code that is executable by the one or more processors for causing the one or more processors to:
- selecting the second subset of tokens using an algorithm that accepts as inputs (i) hierarchical information, and (ii) a threshold parameter associated with the second predefined threshold;
- wherein the hierarchical information includes a n-by-m matrix, wherein n corresponds to a number of hierarchical levels associated with the textual dataset, and wherein m corresponds to a number of tokens in the plurality of tokens.

30. The non-transitory computer-readable medium of claim 29, wherein the algorithm is configured to perform a plurality of iterations, each iteration of the plurality of iterations corresponding to a respective hierarchical level expressed in the matrix and involving:
- identifying one or more tokens, from of the plurality of tokens, corresponding to the respective hierarchical level;
- determining whether each category score for each token of the identified one or more tokens is greater than the second predefined threshold, wherein the second predefined threshold corresponds to a product of (i) the threshold parameter and (ii) a mean of multiple category scores; and
- incorporating, into the second subset of tokens, each token of the identified one or more tokens that has a corresponding category score above the second predefined threshold.

* * * * *